US010220685B2

(12) United States Patent
Yu

(10) Patent No.: US 10,220,685 B2
(45) Date of Patent: Mar. 5, 2019

(54) ADJUSTABLE SUN VISOR APPARATUS

(71) Applicant: Jingchu Yu, Little Ferry, NJ (US)

(72) Inventor: Jingchu Yu, Little Ferry, NJ (US)

(*) Notice: Subject to any disclaimer, the term of this patent is extended or adjusted under 35 U.S.C. 154(b) by 0 days.

(21) Appl. No.: 15/849,085

(22) Filed: Dec. 20, 2017

(65) Prior Publication Data

US 2018/0170155 A1    Jun. 21, 2018

Related U.S. Application Data

(60) Provisional application No. 62/436,895, filed on Dec. 20, 2016.

(30) Foreign Application Priority Data

Jun. 27, 2017  (CN) .......................... 2017 1 0500585
Jun. 27, 2017  (CN) .......................... 2017 2 0756220

(51) Int. Cl.
*B60J 3/02*        (2006.01)

(52) U.S. Cl.
CPC .............. *B60J 3/026* (2013.01); *B60J 3/0208* (2013.01); *B60J 3/0273* (2013.01)

(58) Field of Classification Search
CPC ......... B60J 3/026; B60J 3/0208; B60J 3/0265
USPC .................................. 296/97.6, 97.11–97.13
See application file for complete search history.

(56) References Cited

U.S. PATENT DOCUMENTS

| | | | |
|---|---|---|---|
| 2,261,881 A | 11/1941 | Horstmann | |
| 2,492,074 A | 12/1949 | Thompson | |
| 2,517,872 A | 8/1950 | Hamel | |
| 2,634,161 A | 4/1953 | Beets | |
| 2,894,576 A | 7/1959 | Williams | |
| 2,912,275 A | 11/1959 | O'Neal | |
| 2,917,186 A | 12/1959 | Beets | |
| 2,965,415 A | 12/1960 | Dryden | |
| 3,074,756 A | 1/1963 | Howe | |
| 3,159,421 A | 12/1964 | Samuelson | |
| 3,188,685 A | 6/1965 | Fletcher | |
| 3,383,132 A | 5/1968 | Stamp | |
| 3,454,301 A | 7/1969 | Lehmann | |
| 3,499,679 A | 3/1970 | Olander | |
| 3,853,370 A | 12/1974 | Barnhart | |
| 4,275,917 A | 6/1981 | Marcus | |
| 4,323,275 A | 4/1982 | Lutz | |
| 4,330,148 A | 5/1982 | LaMont | |
| 4,521,046 A | 6/1985 | Foggini | |
| 4,635,995 A | 1/1987 | Mineck | |
| 4,666,205 A | 5/1987 | Nakagawa | |
| 4,681,363 A | 7/1987 | Hemmeke et al. | |

(Continued)

*Primary Examiner* — Dennis H Pedder
(74) *Attorney, Agent, or Firm* — Michael J. Feigin, Esq.; Feigin and Fridman LLC

(57) ABSTRACT

An adjustable sun visor apparatus having: an arm received into an open tube; an auxiliary visor panel; a ball; a plug; a tension spring; a ball compartment configured to house the ball and the plug and pivot around the ball; a ball seat base configured to receive a portion of the ball; a bend-resistant spring configured to receive the plug and the arm; a first means and a second means for gripping a sun visor; the ball seat base being connected to the first means; wherein the tension spring biases the bend-resistant spring downwards; such that a movement of the sun visor causes the arm to move within the open tube and thus prevents a movement of the auxiliary visor panel; such that the sun visor blocks light from the front and the auxiliary visor panel blocks light from the side in a vehicle.

20 Claims, 28 Drawing Sheets

(56) References Cited

U.S. PATENT DOCUMENTS

| | | |
|---|---|---|
| 4,913,483 A | 4/1990 | Jasso |
| 4,988,139 A | 1/1991 | Yamada |
| 4,989,910 A | 2/1991 | Mersman |
| 5,044,687 A | 9/1991 | Abu-Shumays et al. |
| 5,213,389 A | 5/1993 | Loftis et al. |
| 5,282,571 A | 2/1994 | Smith et al. |
| 5,445,427 A | 8/1995 | Vandagriff |
| 5,489,078 A | 2/1996 | Risley |
| 5,678,880 A | 10/1997 | Keller |
| 6,412,850 B1 | 7/2002 | Francis et al. |

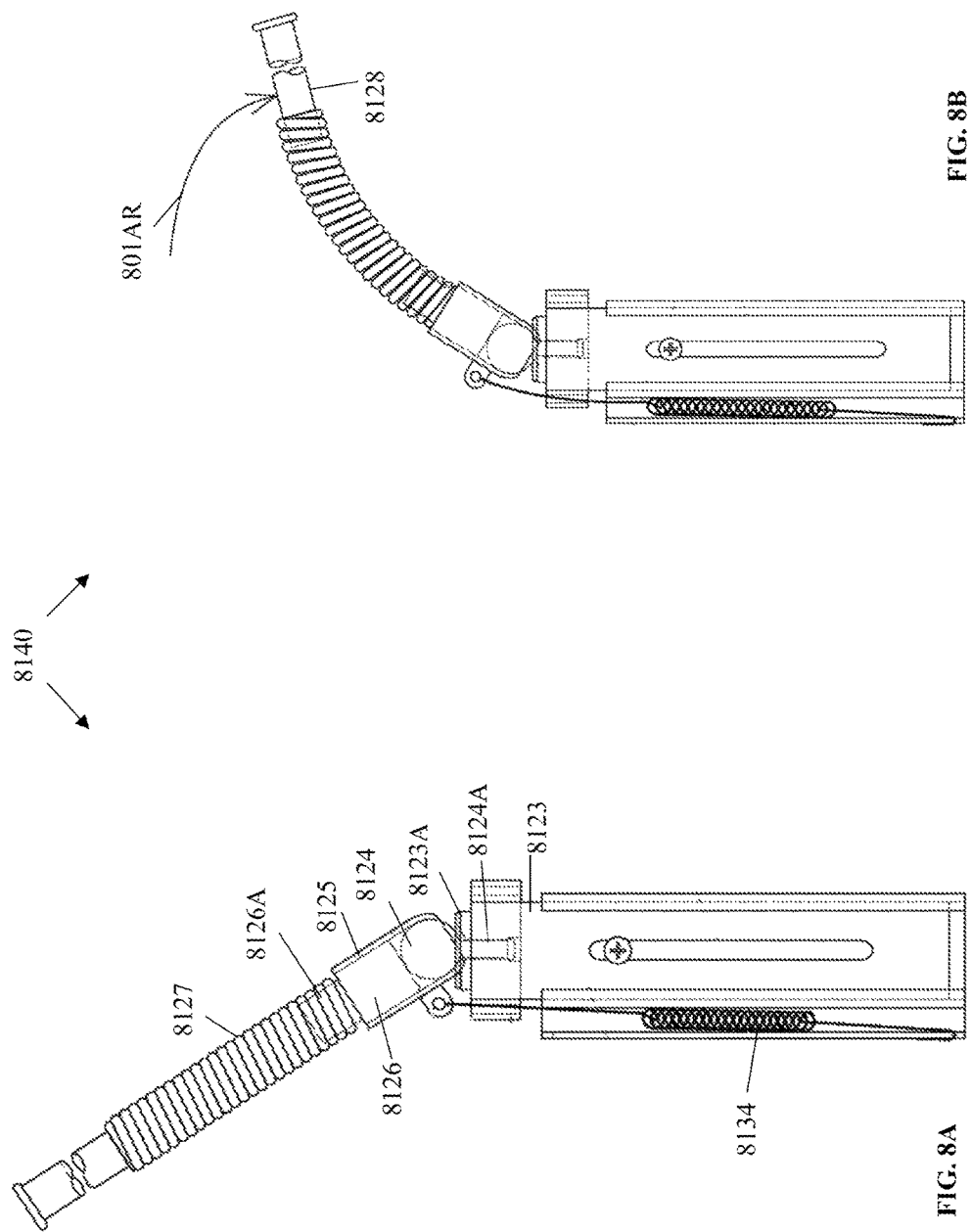

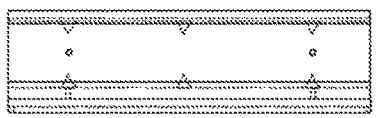
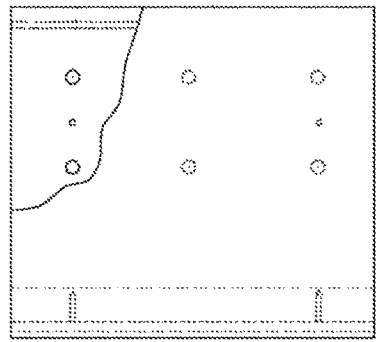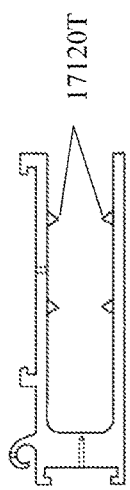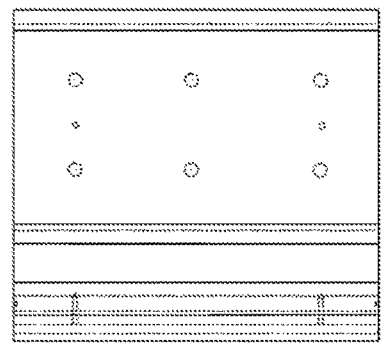

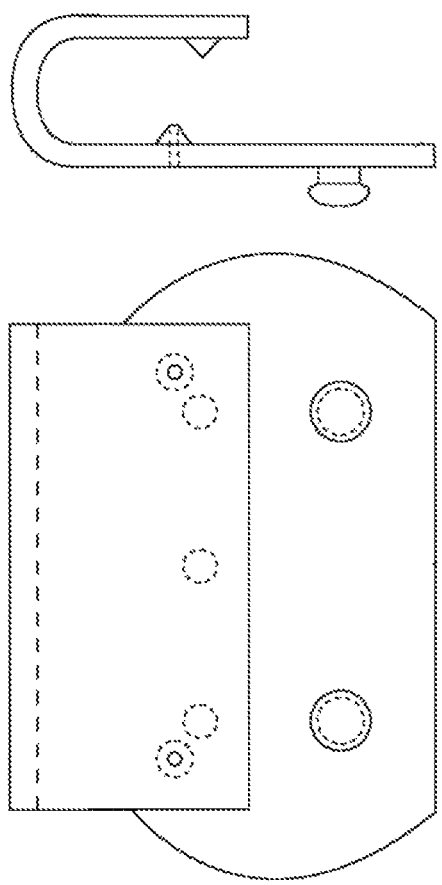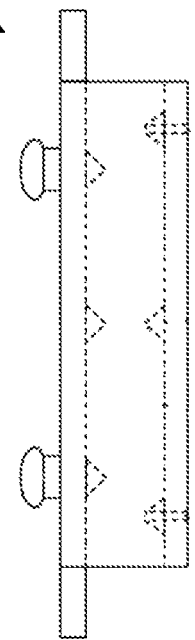
FIG. 19A
FIG. 19B
FIG. 19C

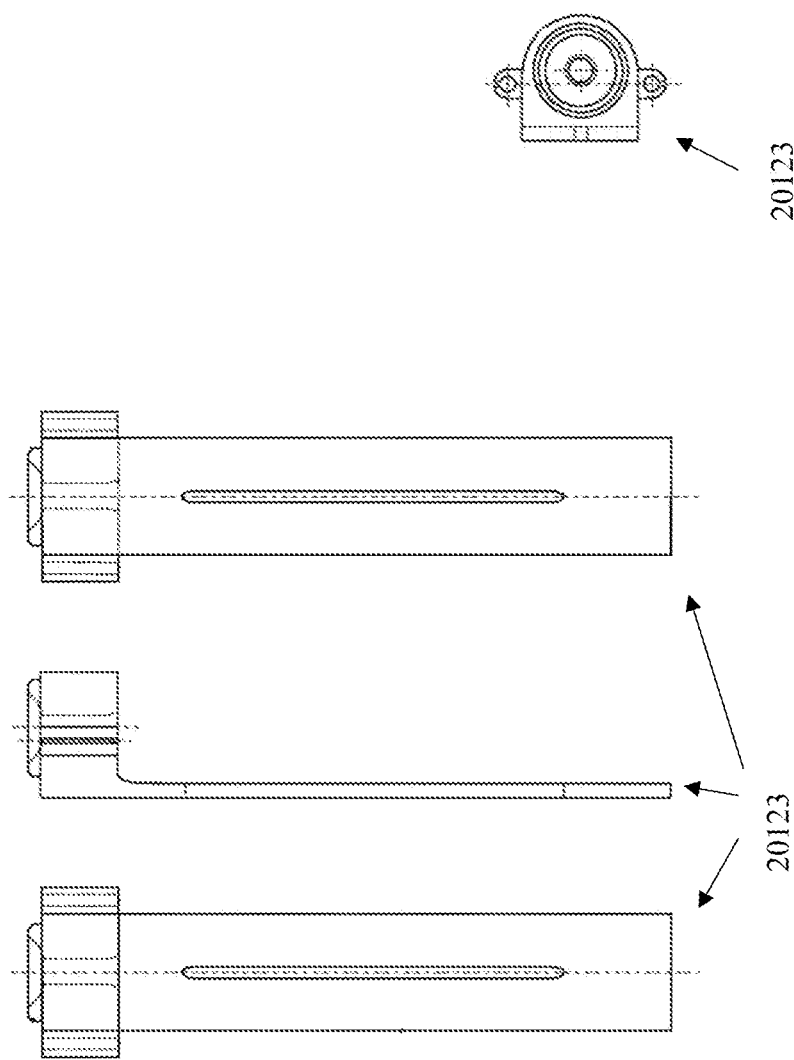

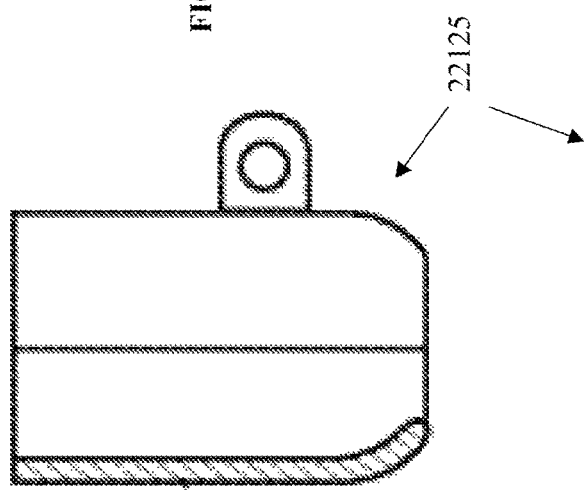
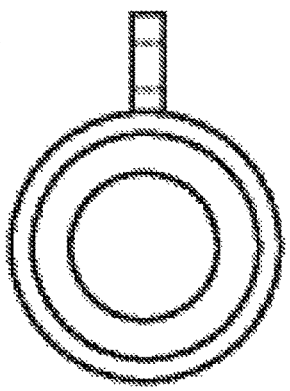
FIG. 22A
22125
FIG. 22B
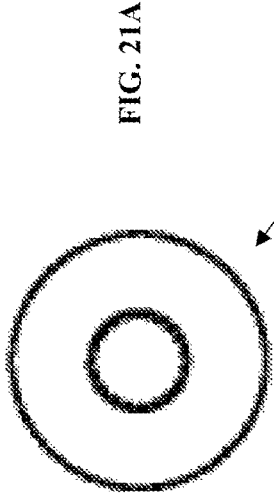
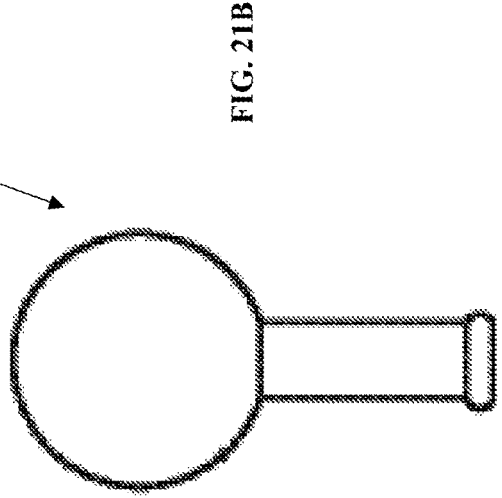
FIG. 21A
21124
FIG. 21B

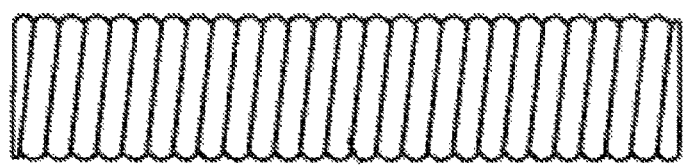
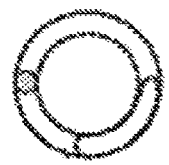
FIG. 24A  24127  FIG. 24B
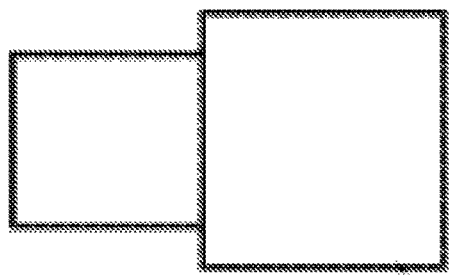
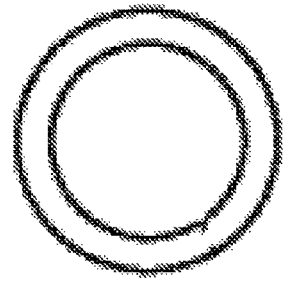
FIG. 23A  23126  FIG. 23B

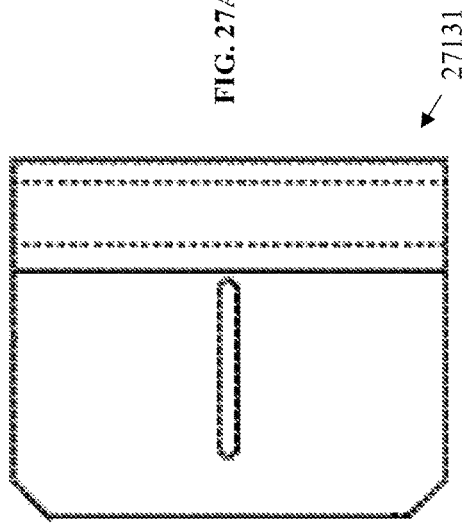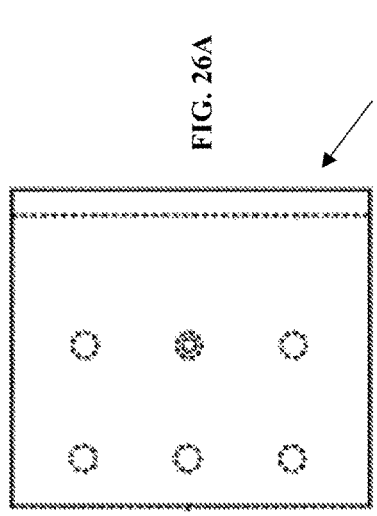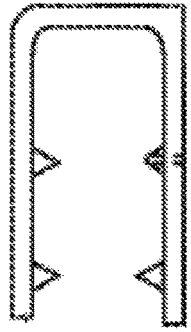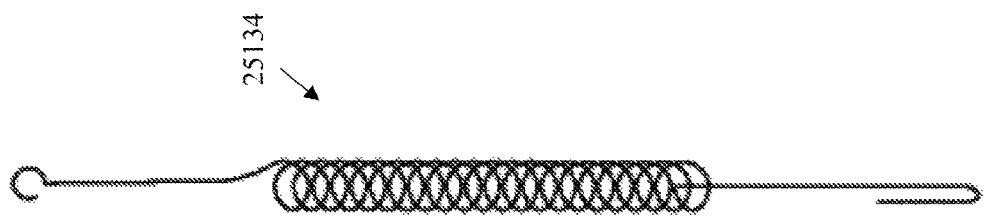

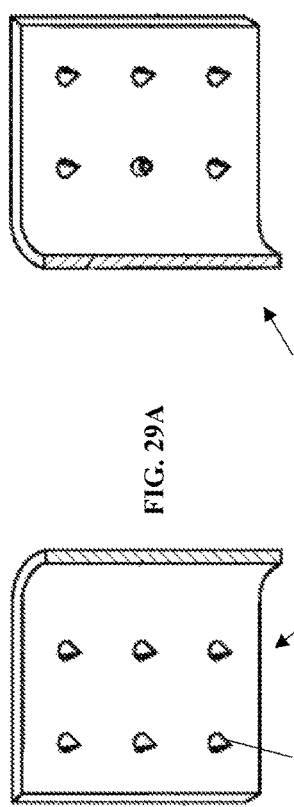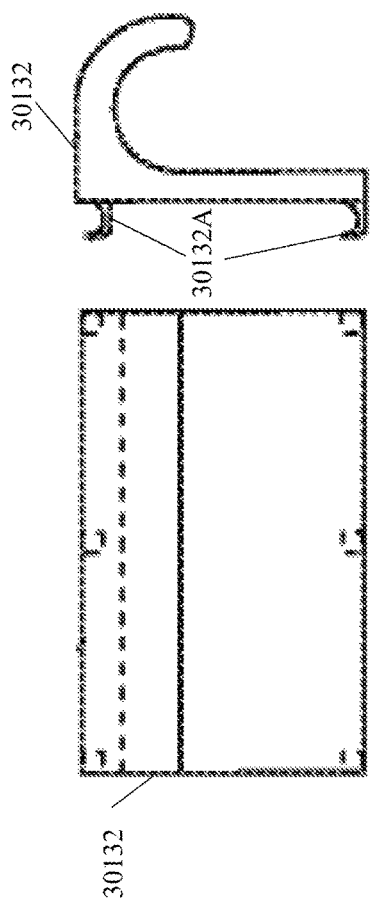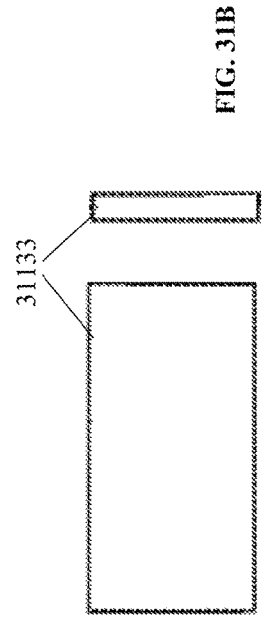

33128

33128

ADJUSTABLE SUN VISOR APPARATUS

CROSS-REFERENCE TO RELATED APPLICATIONS

This application claims the benefit of U.S. Provisional Application No. 62/436,895, filed Dec. 20, 2016, and claims the benefit of Chinese Application No. 201710500585.7, filed on Jun. 27, 2017, and Chinese Application No. 201720756220.6, filed on Jun. 27, 2017, which are hereby incorporated by reference, to the extent that they are not conflicting with the present application.

BACKGROUND OF INVENTION

1. Field of the Invention

The invention relates generally vehicle accessories and more specifically to vehicle sun visors.

2. Description of the Related Art

In vehicles, a sun visor is typically provided in the front left and right sides of the vehicle to block light. The sun visors provided in most vehicles are not able to provide blockage of light on both a front and a side of the vehicle at once, and is only able to block light on either the front or the side at any given time. Existing sun visor add-ons that may help to block light on both the front and the side at the same time may not be usable in all different models and shapes of vehicle interiors, and also, may only be usable on a left side or only on a right side of a vehicle interior. Existing sun visor add-on devices or apparatuses may also damage the interior of the vehicle when being mounted to or assembled to the vehicle. Thus, there is a need for a solution to these problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an adjustable sun visor apparatus for blocking light from a front and a side in a vehicle, together with a sun visor of the vehicle is provided, the adjustable sun visor apparatus comprising: an auxiliary visor unit having: an arm having a first arm end having a stopper, and a second arm end; an open seam tube having a first tube end and a second tube end, the open seam tube being configured to receive the arm, wherein the stopper is larger than the open seam tube; and an auxiliary visor panel extending from the open seam tube between the first tube end and the second tube end, the auxiliary visor panel configured to block light; an automatic adjustment unit having: a ball having a round ball portion and a ball leg portion; a plug having a plug head portion and a plug leg portion; a tension spring having a top hook and a bottom hook; a ball compartment having a ring, the ball compartment configured to house the round ball portion and the plug head portion; a ball seat base having a hole configured to receive the ball leg portion into the ball seat base such that the ball is anchored into the ball seat base, the hole being in a center of a bowl configured to hold the round ball portion housed by the ball compartment, and a straight ball seat base portion; a bend-resistant spring having a first spring end and a second spring end, the first spring end configured to receive the plug leg portion and the second spring end being configured to receive the second arm end; wherein the ball compartment is configured to pivot around the ball such that the associated first spring end of the bend-resistant spring pivots around the ball; a base unit having: a bridge having a first straight bridge portion and a second curved bridge portion; a vertical clip having a top vertical clip end and a bottom vertical clip end, a spring compartment configured to receive the tension spring, the spring compartment extending from the top vertical clip end and the bottom vertical clip end, the bottom vertical clip end having a first notch, jaws configured to grip the sun visor, a first track and a first set of guide rails configured to receive the straight ball seat base portion, and a second track and a second set of guide rails configured to receive the first straight bridge portion; and a horizontal clip having a plurality of knobs, each knob of the plurality of knobs being configured to fit into a corresponding pivot hole of the bridge; wherein the top hook is received into the ring, and the bottom hook is received into the first notch; and wherein the tension spring is configured to bias the top hook and the bottom hook together and thus bias the ring, the bend-resistant spring, and the arm downwards; such that a movement of the sun visor causes a movement of the vertical clip gripped to the sun visor, and also causes the arm to move within the open seam tube and thus prevents a movement of the auxiliary visor panel; and a locking unit having a holder and a lock, the locking unit configured to be clipped to the sun visor and hold the auxiliary visor panel against the sun visor into a closed state or release the auxiliary visor panel from the sun visor into an open state; such that in the open state the sun visor blocks light from the front and the auxiliary visor blocks light from the side in the vehicle. Thus, an advantage is that adjustable sun visor apparatus is reversible and can easily be switched by the user from the right side of a vehicle to the left side of a vehicle, or vice versa, such that a single model of the adjustable sun visor may be used for both front seats of a vehicle. Another advantage is that the vehicle need not be modified or damaged in order for the adjustable sun visor to be mounted into the vehicle. Another advantage may be that the automatic adjustment unit may provide stability to the auxiliary visor panel such that the panel's position remains the same even while the vehicle sun visor is being moved. Another advantage may be that the adjustable sun visor apparatus can be used in a variety of interior shapes and models, such as, for example, within most small vehicles including cars, motorboats, or small aircrafts.

In another aspect, an adjustable sun visor apparatus for blocking light from a front and a side in a vehicle, together with a sun visor of the vehicle is provided, the adjustable sun visor apparatus comprising: an auxiliary visor unit having: an arm having a first arm end and a second arm end; an open seam tube having a first tube end and a second tube end, the open seam tube being configured to receive the arm; and an auxiliary visor panel extending from the open seam tube between the first tube end and the second tube end, the auxiliary visor panel being configured to block light; an automatic adjustment unit having: a ball having a round ball portion and a ball leg portion; a plug having a plug head portion and a plug leg portion; a tension spring having a top hook and a bottom hook; a ball compartment having a ring, the ball compartment being configured to house the round ball portion and the plug head portion; a ball seat base having a hole configured to receive the ball leg portion into the ball seat base such that the ball is anchored into the ball seat base; a bend-resistant spring having a first spring end and a second spring end, the first spring end configured to receive the plug leg portion and the second spring end being configured to receive the second arm end; wherein the ball compartment is configured to pivot around the ball such that the associated first spring end of the bend-resistant spring pivots around the ball; a base unit having: a bridge; a first means for gripping onto a first edge of the sun visor; and a second means for gripping onto a second edge of the sun visor; wherein the bridge is configured to connect the first means for gripping onto the first edge of the sun visor to the second means for gripping onto the second edge of the sun visor; and wherein the automatic adjustment unit is configured to connect to the first means; wherein the top hook is received into the ring, and the bottom hook is received into the first means for gripping onto the first edge of the sun visor; and wherein the tension spring is configured to bias the top hook and the bottom hook together and thus bias the ring, the bend-resistant spring, and the arm downwards; such that a movement of the sun visor causes a movement of first means for gripping onto the first edge of the sun visor, and also causes the arm to move within the open seam tube and thus prevents a movement of the auxiliary visor panel; such that in an open state the sun visor blocks light from the front and the auxiliary visor panel blocks light from the side in the vehicle. Again, an advantage is that adjustable sun visor apparatus is reversible and can easily be switched by the user from the right side of a vehicle to the left side of a vehicle, or vice versa, such that a single model of the adjustable sun visor may be used for both front seats of a vehicle. Another advantage is that the vehicle need not be modified or damaged in order for the adjustable sun visor to be mounted into the vehicle. Another advantage may be that the automatic adjustment unit may provide stability to the auxiliary visor panel such that the panel's position remains the same even while the vehicle sun visor is being moved. Another advantage may be that the adjustable sun visor apparatus can be used in a variety of interior shapes and models, such as, for example, within most small vehicles including cars, motorboats, or small aircrafts.

In another aspect, an adjustable sun visor apparatus for blocking light from a front and a side in a vehicle, together with a sun visor of the vehicle is provided, the adjustable sun visor apparatus comprising: an auxiliary visor unit configured to maintain a stable position of an auxiliary visor panel by having: a ball having a round ball portion and a ball leg portion; a plug having a plug head portion and a plug leg portion; a tension spring having a top hook and a bottom hook; a ball compartment having a ring, the ball compartment being configured to house the round ball portion and the plug head portion; a ball seat base having a top ball seat base end and a bottom ball seat base end, a hole at the top ball set base end, the hole being configured to receive the ball leg portion into the ball seat base such that the ball is anchored into the ball seat base, the hole being in a center of a bowl configured to hold the round ball portion housed by the ball compartment, and a straight ball seat base portion; a bend-resistant spring having a first spring end and a second spring end, the first spring end configured to receive the plug leg portion and the second spring end being configured to receive the second arm end; wherein the ball compartment is configured to pivot around the ball such that the associated first spring end of the bend-resistant spring pivots around the ball; an arm having a first arm end and a second arm end; an open seam tube having a first tube end and a second tube end, the open seam tube being configured to receive the arm; and wherein the auxiliary visor panel extends from the open seam tube between the first tube end and the second tube end, the auxiliary visor panel being configured to block light; and wherein the tension spring is configured to bias the top hook received into the ring and the bottom hook received into the bottom ball seat base end together and thus bias the ring, the bend-resistant spring, and the arm downwards; such that a movement of the sun visor causes a movement of the ball seat base and also causes the arm to move within the open seam tube and thus prevents a movement of the auxiliary visor panel. Again, an advantage is that adjustable sun visor apparatus is reversible and can easily be switched by the user from the right side of a vehicle to the left side of a vehicle, or vice versa, such that a single model of the adjustable sun visor may be used for both front seats of a vehicle. Another advantage is that the vehicle need not be modified or damaged in order for the adjustable sun visor to be mounted into the vehicle. Another advantage may be that the automatic adjustment unit may provide stability to the auxiliary visor panel such that the panel's position remains the same even while the vehicle sun visor is being moved. Another advantage may be that the adjustable sun visor apparatus can be used in a variety of interior shapes and models, such as, for example, within most small vehicles including cars, motorboats, or small aircrafts.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 8A-8B illustrate the left side elevation view and another example of the left side elevation view, respectively, of the automatic adjustment unit of the adjustable sun visor device, according to an aspect.

FIGS. 17A-17D illustrate the front cutaway view, the side elevation view, the top plan view, and the rear elevation view, respectively, of the vertical clip, according to an aspect.

FIGS. 19A-19C illustrate the front view, the side elevation view, and the bottom view, respectively, of the horizontal clip, according to an aspect.

FIGS. 20A-20D illustrate the rear view, the side view, the front view, and the top view, respectively, of the ball seat base, according to an aspect.

FIGS. 21A-21B illustrate the bottom view and the side view, respectively, of the ball, according to an aspect.

FIGS. 22A-22B illustrate the side view and the top view, respectively, of the ball compartment, according to an aspect.

FIGS. 23A-23B illustrate the side view and the top view, respectively, of the plug, according to an aspect.

FIGS. 24A-24B illustrate the side view and the top view, respectively, of the bend-resistant spring, according to an aspect.

FIG. 25 illustrates the side view of the tension spring, according to an aspect.

FIGS. 26A-26B illustrate the front view and the top view, respectively, of the holder, according to an aspect.

FIGS. 27A-27B illustrate the front view and the top view, respectively, of the lock, according to an aspect.

FIGS. 29A-29B illustrate the front cutaway view and the rear cutaway view, respectively, of the holder, according to an aspect.

FIGS. 30A-30B illustrate the front view and the side elevation view, respectively, of the tube gripper, according to an aspect.

FIGS. 31A-31B illustrate the front view and the top view, respectively, of the double-sided adhesive pad, according to an aspect.

DETAILED DESCRIPTION

Figure 1:
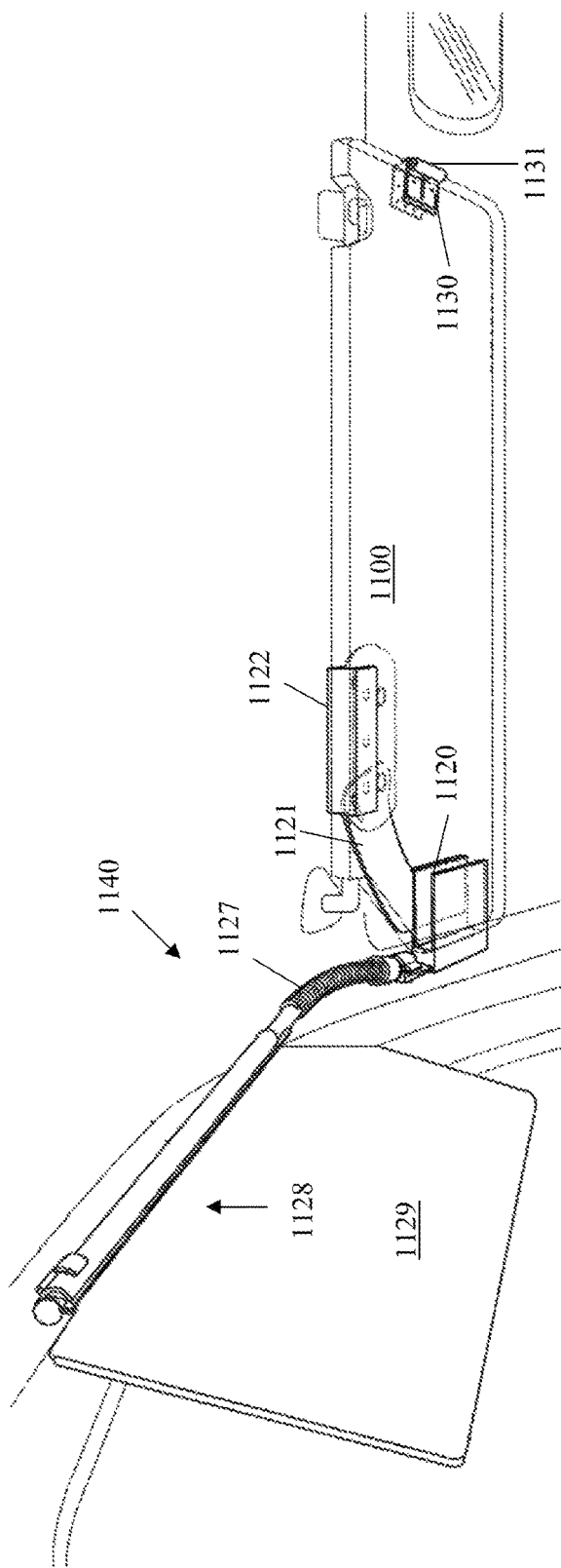
FIG. 1 illustrates a perspective view of an adjustable sun visor device mounted on a sun visor in use in an open state, within left side the interior of an exemplary vehicle, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 4120 and 6120, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a perspective view of an adjustable sun visor device 1140 ("adjustable sun visor device," "sun visor apparatus," "adjustable sun visor," "sun visor device," "apparatus," or "device") mounted on a sun visor 1100 in use in an open state, within left side the interior of an exemplary vehicle, according to an aspect. As shown as an example, the adjustable sun visor 1140 may be used on the left side, which may be a driver seat, and may be mounted onto an existing sun visor 1100 of a vehicle. The adjustable sun visor 1140 may be provided with a bridge 1121, a vertical clip 1120, a horizontal clip 1122, a holder 1130 and a lock 1131 associated with the holder 1130, a bend-resistant spring 1127, an auxiliary visor panel 1129, and an arm 1128. The auxiliary visor panel 1129 may be configured to block light and UV radiation, for example.

Figure 2:
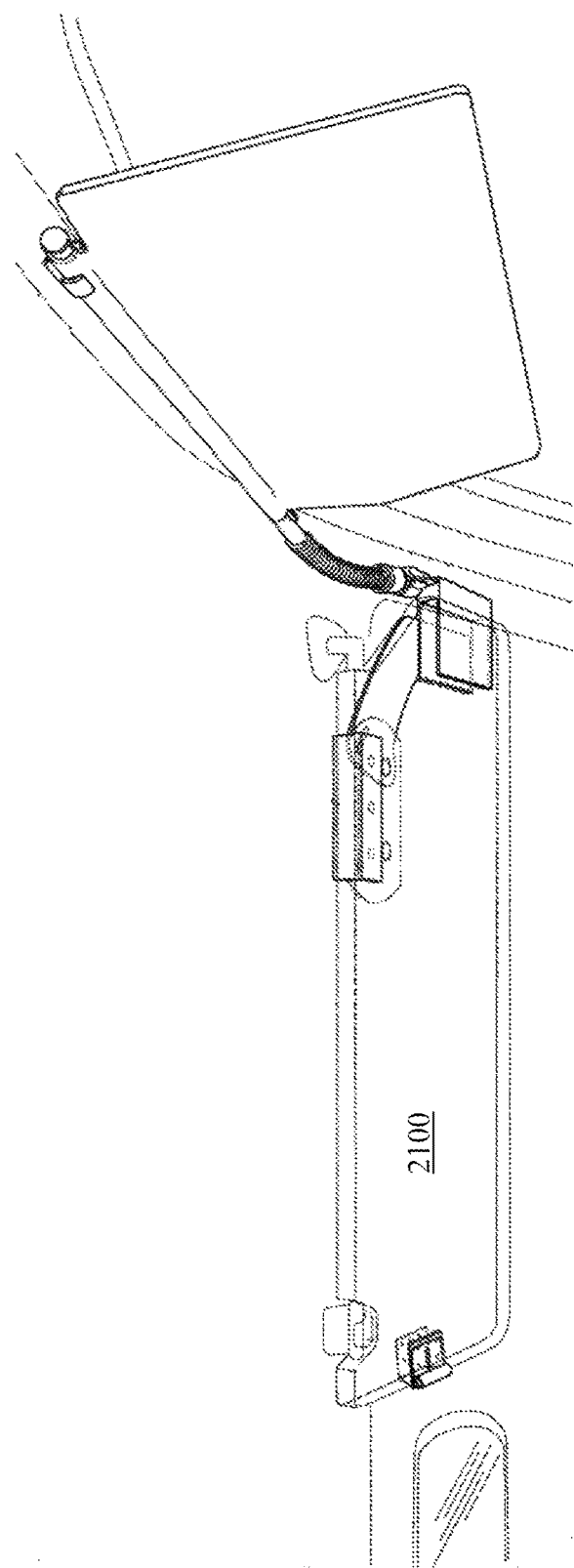
FIG. 2 illustrates a perspective view of an adjustable sun visor device mounted on a sun visor in use in an open state, within the right side interior of an exemplary vehicle, according to an aspect.

FIG. 2 illustrates a perspective view of an adjustable sun visor device 2140 mounted on a sun visor 2100 in use in an open state, within the right side interior of an exemplary vehicle, according to an aspect. As shown as an example, the adjustable sun visor 2140 may be used on the right side, which may be a passenger seat, and may be mounted onto an existing sun visor 2100 of a vehicle.

Figure 3:
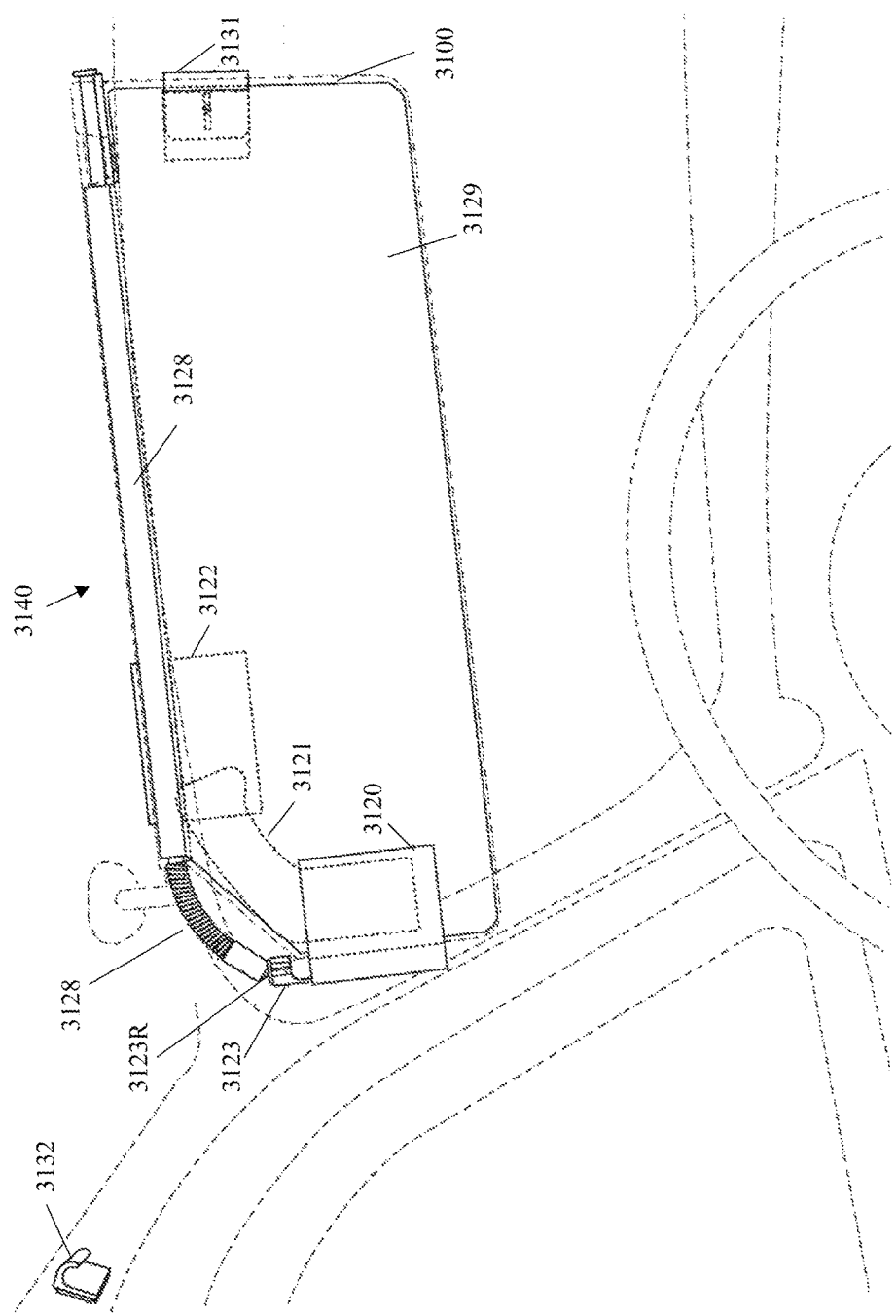
FIG. 3 illustrates a front view of the adjustable sun visor device mounted to an exemplary sun visor in a closed state, according to an aspect.

FIG. 3 illustrates a front view of the adjustable sun visor device 3140 mounted to an exemplary sun visor 3100

(represented by broken lines behind the visor device 3140) in a closed state, according to an aspect. As an example, the adjustable sun visor device may be closed or locked such that the visor panel 3129 is flat against the sun visor 3100 of a vehicle. The adjustable sun visor device 3140 may be provided with a horizontal clip 3122, a vertical clip 3120, a bridge 3121, a ball seat base 3123, a right spring guide 3123R.

Figure 4:
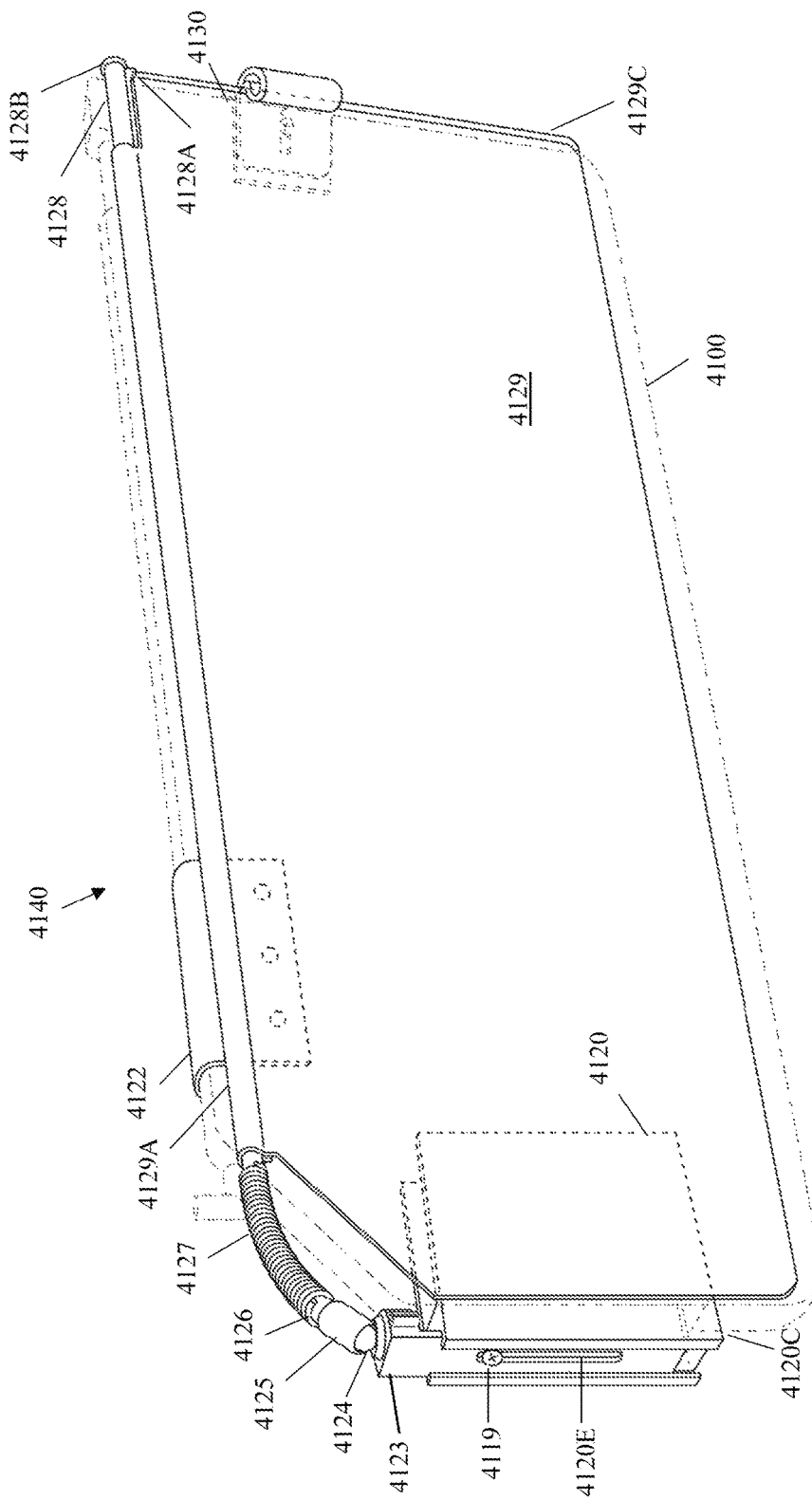
FIG. 4 illustrates the front perspective view of the assembled adjustable sun visor device, according to an aspect.

FIG. 4 illustrates the front perspective view of the assembled adjustable sun visor device 4140, according to an aspect. An exemplary sun visor 4100 is represented by broken lines behind the visor device 4140. The sun visor device 4140 may be provided with the following exemplary components: a horizontal clip 4122, a vertical clip 4120, a guide 4120C and a screw 4119 and associated screw hole 4120E within the guide 4120C, a ball 4124 and associated ball compartment 4125 and ball seat base 4123, a plug 4126, a bend-resistant spring 4127, an auxiliary visor panel 4129, an open seam tube 4129A, an arm 4128 and associated strip 4128A and arm end stopper 4128B, a holder 4130, and a key foot 4129C. The strip 4128A may extend from the first arm end to the second arm end, such that the strip prevents a circular movement of the arm.

Figure 5:
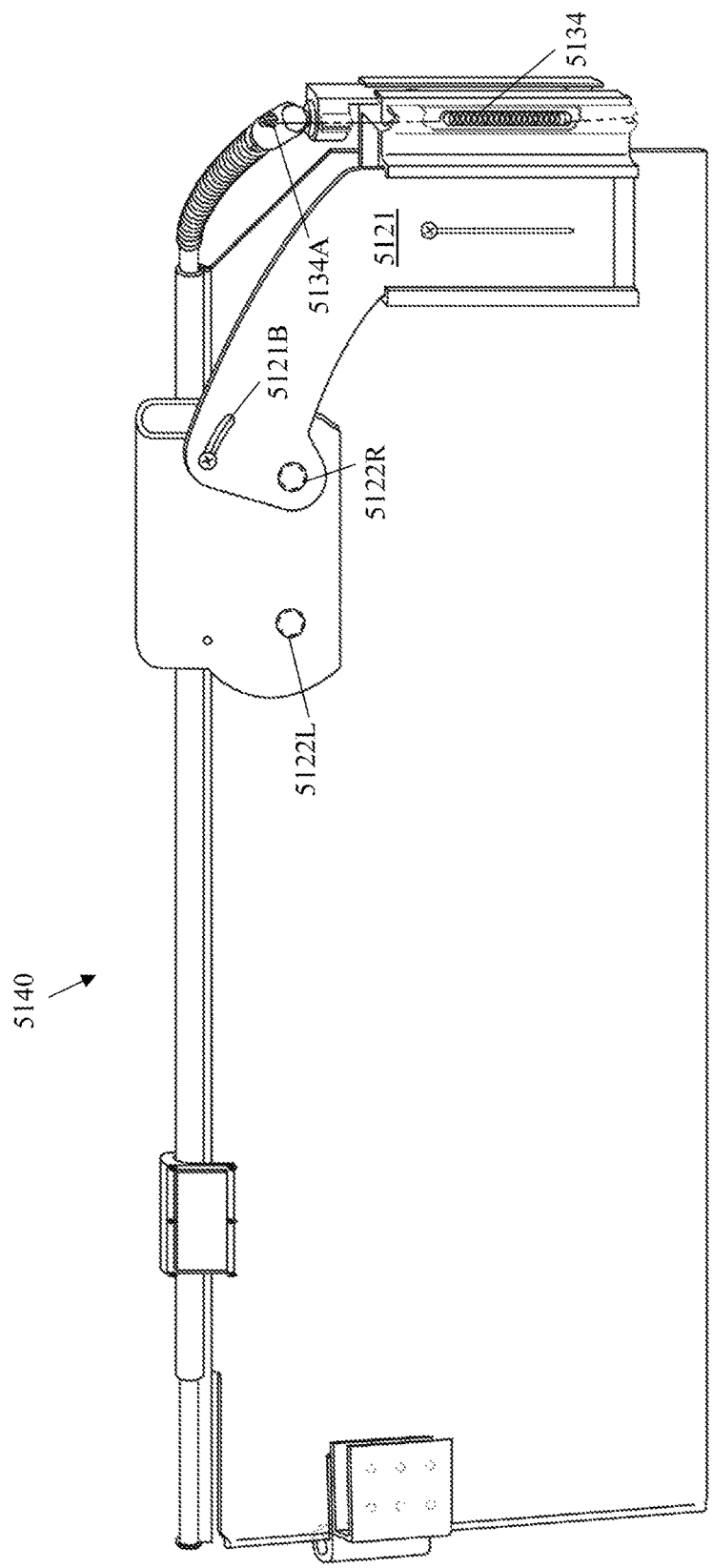
FIG. 5 illustrates the back perspective view of the assembled adjustable sun visor device, according to an aspect.

FIG. 5 illustrates the back perspective view of the assembled adjustable sun visor device 5140, according to an aspect. Exemplary components that may be visible from a back view are: a left knob 5122L and a right knob 5122R, a kidney-shaped slot 5121B, a bridge 5121, and a tension spring 5134 (shown in an enlarged detail and discussed further when referring to FIG. 7).

Figure 6A:
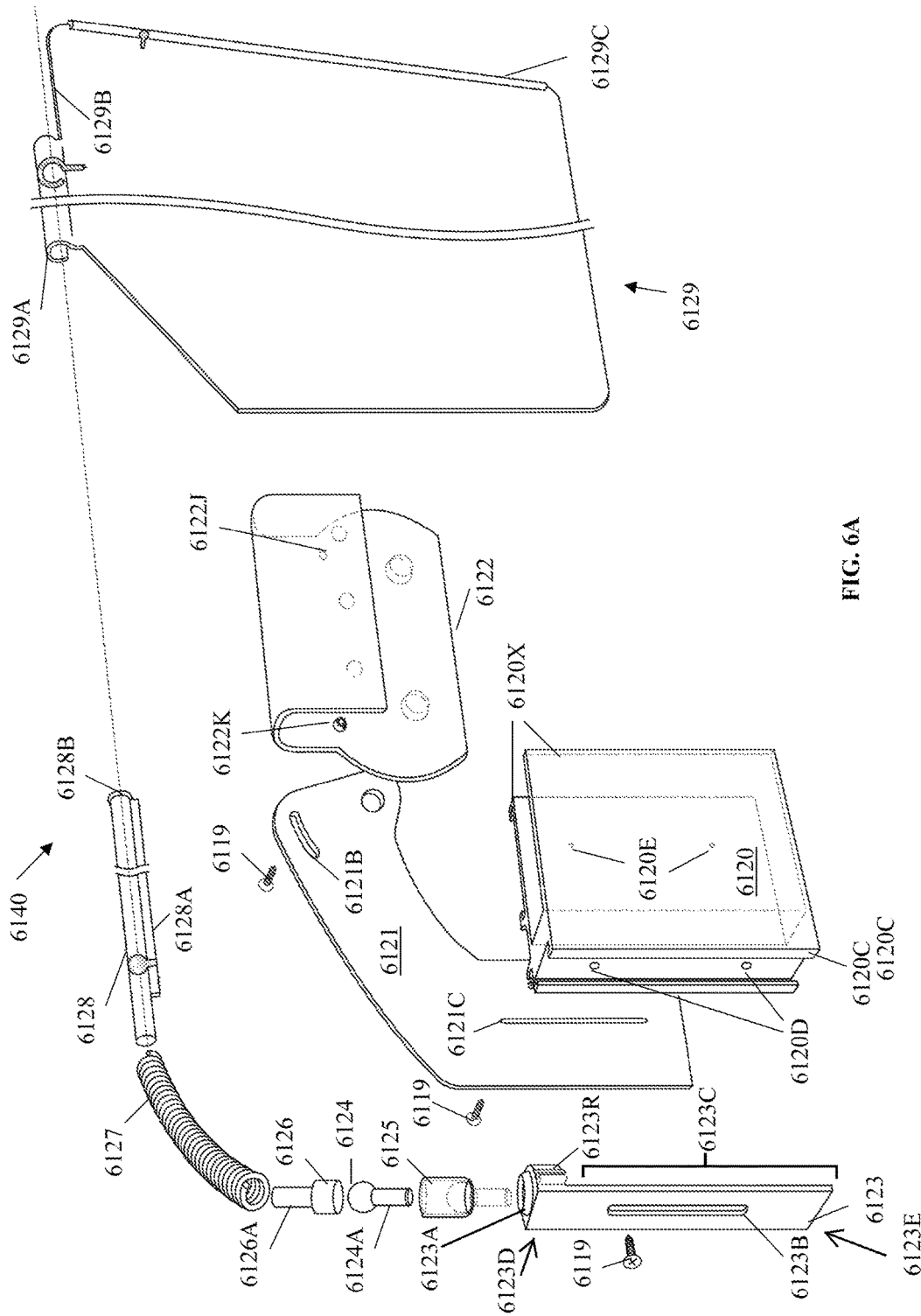
FIG. 6A illustrates the exploded front perspective view of the adjustable sun visor device, according to an aspect.

FIG. 6A illustrates the exploded front perspective view of the adjustable sun visor device 6140, according to an aspect. The adjustable sun visor device 6140 may include the following exemplary components. An arm 6128 may be provided with an associated strip 6128A and an arm end stopper 6128B. The arm 6128 may be associated with a bend-resistant spring 6127 which may receive a plug 6126, which may rest against a ball 6124 within an associated ball compartment 6125 on a ball seat base 6123. The ball 6124 may include a leg 6124A, and the plug 6126 may also include a leg 6126A. The ball seat base 6123 may have a bowl 6123A at a top end of the ball seat base ("top ball seat base end") 6123D, and the ball seat base 6123 may also be provided with an opposite bottom ball seat base end 6123E, a right spring guide 6123R, screws 6119, and a guide hole 6123B for a screw 6119. The ball seat base 6123 may also be provided with a straight ball seat base portion 6123C extending downwards from the bowl 6123A, as shown. A bridge 6121 may be provided with a bridge guide slot ("bridge guide slot" or "guide slot") 6121C and a kidney-shaped slot 6121B. The bridge 6121 may be associated with a vertical clip 6120 and a horizontal clip 6122. The vertical clip 6120 may be provided with jaws 6120X for holding the sun visor, for example. The vertical clip 6120 may also include guide rails 6120C and screw holes 6120D within the guide 6120C and screw holes 6120E within the body of the clip. The horizontal clip 6122 may be provided with a right knob 6122R and a left knob 6122L, and screw holes 6122K and 6122J. An auxiliary visor panel 6129 may be provided with a key foot 6129C, and an open seam tube 6129A, which may include an open space as indicated by 6129B.

The auxiliary visor unit of the sun visor apparatus may be comprised of the arm 6128 and the auxiliary visor panel 6129. The arm 6128 and the auxiliary visor panel 6129 may be assembled together into the auxiliary visor unit by carrying out the following exemplary process. First, a user may position the arm 6128 such that the open portion of the open seam tube 6128A faces downwards. Next, the user may slide the arm 6128 from the open space 6129B of the auxiliary visor panel 6129 into the open seam tube 6128A. The arm end stopper 6128B may prevent the arm from slipping all the way into the open seam tube. Next, the user may push in the arm 6128 until the arm end 6128B is fully against the auxiliary visor panel 6129.

Figure 6C:
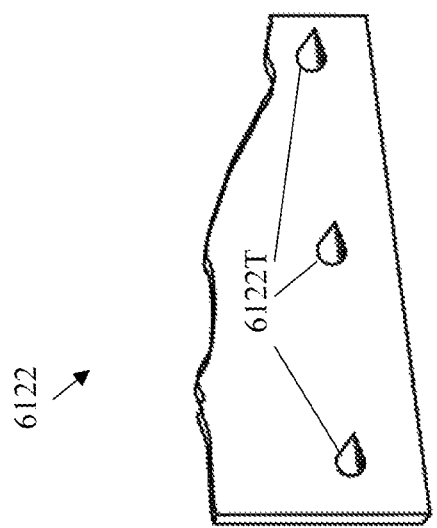
FIGS. 6B-6C illustrate the cutaway front view and the partial cutaway rear view, respectively, of the horizontal clip, according to an aspect.
Figure 6B:
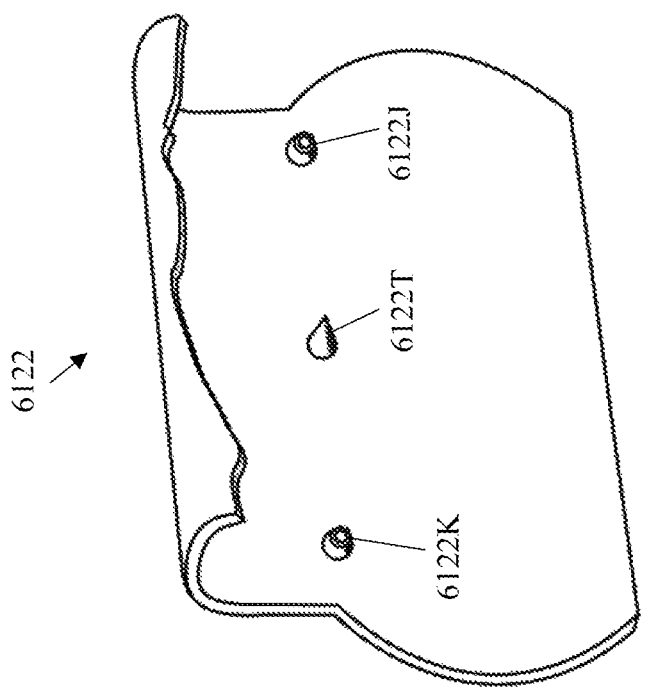

FIGS. 6B-6C illustrate the cutaway front view and the partial cutaway rear view, respectively, of the horizontal clip 6122, according to an aspect. As shown as an example, the horizontal clip 6122 may be provided with screw holes 6122K and 6122J. The interior surfaces of the horizontal clip 6122 may include teeth 6122T which may help provide the clip with a better grip to hold an object such as a sun visor.

Figure 7:
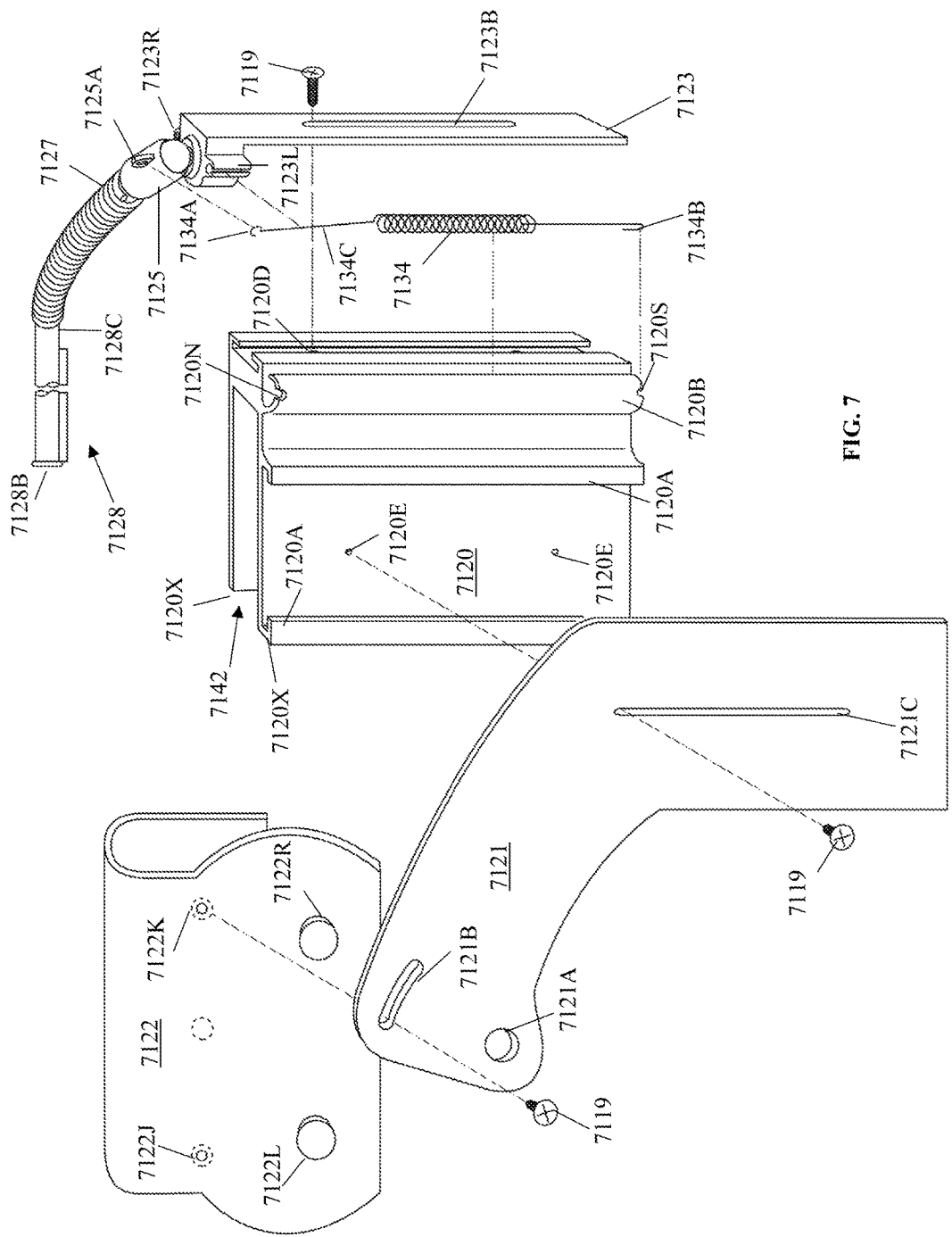
FIG. 7 illustrates the exploded rear perspective view of the bridge, the vertical clip, the horizontal clip, the ball seat base, and the arm of the adjustable sun visor device, according to an aspect.

FIG. 7 illustrates the exploded rear perspective view of the bridge 7121, the vertical clip 7120, the horizontal clip 7122, the ball seat base 7123, and the arm 7128 of the adjustable sun visor device, according to an aspect. As shown as an example, the tension spring 7134 may be provided with a top hook 7134A at a top end, and a bottom hook 7134B at a bottom end. The top hook 7134A may be a C-shaped hook, and the bottom hook 7134B may be a U-shaped hook. The ball seat base 7123 may be provided with a left notched spring guide 7123L, which may be configured to receive a neck 7134C of the top hook 7124A. The ball seat base 7123 may also include a similar right notched spring guide 7123R on the opposite side, which may receive a second tension spring, for example. As another example, one notched spring guide may remain empty while the second notched spring guide is in use, and the notched spring guide receiving the tension spring may switch according to the side of the vehicle that the adjustable sun visor device is being used on. The ball compartment 7125 may be provided with a ring 7125A which may be configured to receive the C-shaped hook 7134A. A screw 7119 received into a screw hole 7120D through a guide hole 7123B may be used to secure the ball seat base 7123 to the vertical clip 7120. The horizontal clip 7122 may include a left knob 7122L and a right knob 7122R.

The adjustable sun visor may be provided in parts such that a user may assemble the units of the apparatus. The apparatus may be comprised of a base unit, an automatic adjustment unit, an auxiliary visor unit, and a locking unit. The base unit of the adjustable sun visor device may be comprised of the vertical clip 7120, the bridge 7121, and the horizontal clip 7122.

The user may assemble the base unit by carrying out the following exemplary process. First, the section of the bridge 7121 having the guide slot 7121C may be inserted into the track or guide rails 7120A of the vertical clip 7120. The vertical clip 7120 may have jaws 7120X, between which an open portion 7142 may be provided. When the bridge 7121 is inserted into the track or guide rails 7120A, the curved top section of the bridge 7121 may be in a direction such that it extends outwards from the side of the vertical clip 7120 having the open portion 7142. Next, a screw 7119 received into a screw hole 7120E through the guide slot 7121C may be used to secure the bridge 7121 to the vertical clip 7120. Next, the horizontal clip 7122 may be connected to the bridge 7121, now connected to the vertical clip 7120, by pushing the right knob 7122R through and into the pivot hole 7121A of the bridge 7121. Next, a screw 7119 may be received into a screw hole 7122K through the kidney-shaped slot 7121B to secure the bridge 7121 to the horizontal clip 7122.

Figure 14:
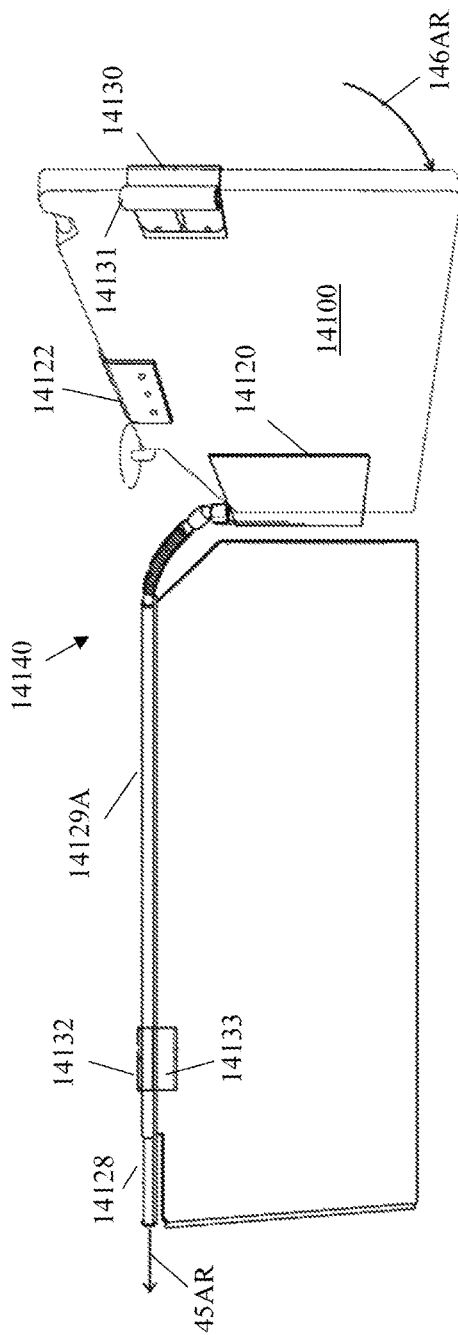
FIGS. 14-15 illustrate the perspective views of the adjustable sun visor device and clipped to a vehicle sun visor and at two different angles, according to an aspect.

The sun visor apparatus may be fully assembled by a user after the base unit (discussed when referring to FIG. 7), the automatic adjustment unit (discussed when referring to FIGS. 8A-8B), the auxiliary visor unit (discussed when referring to FIG. 6A), and the locking unit (discussed when referring to FIGS. 28A-32B) have been fully assembled. The following exemplary process may be carried out. First, the base unit is connected with the automatic adjustment unit. The ball seat base 7123 may be aligned with the automatic adjustment unit, by sliding the section having the guide hole 7123A into the track between the guide rails 7120C of the vertical clip 6120. The bowl 7123A is kept in an upwards position on top of the ball seat base 7123 during this step, and also faces towards the direction of the two jaws 7120X of the vertical clip 6120. A screw 7119 is received into a screw hole 7120D through a guide slot 7121C to secure the automatic adjustment unit to the base unit. Next, the tension spring 7134 is pushed through an open seam of the spring compartment 7120B of the vertical clip 7120. The spring compartment 7120B may have an open top end and an open bottom end such that the tension spring 7134 may be inserted into the spring compartment and such that the tension spring top hook 7134A and bottom hook 7134B are passed through the open top and bottom. The bottom U-shaped hook 7134B is hooked onto the first notch 7120S. The top C-shaped hook 7134A is left free at this step. Next, the arm 7128, having a first end with an arm end 7128B and a second end 7128C, is pushed through the bend-resistant through such that the second end is received into the spring 7127. Next, the neck 7134C of the tension spring, which may be between the coiled portion of the spring and the top hook 7134A, is received into the left spring guide 7123L. Next, the top hook 7134C is hooked to the ring 7125A of the ball compartment 7125. Next, the adjustable sun visor device is mounted onto a sun visor of a vehicle. The sun visor may be flipped down from the ceiling of the vehicle and kept in a downwards position, as shown in FIG. 14. Next, the horizontal clip 7122 is disconnected from the apparatus by unscrewing and removing the screw 7119 from the screw hole 7122K of the bridge 121. The pivot hole 7121A of the bridge 7121 is removed from around the right knob 7122R of the horizontal clip 7122. Next, the horizontal clip 7122 is aligned such that the side having the knob 7122R faces the interior wall of the vehicle to which the apparatus is being mounted. The horizontal clip 7122 is aligned with the top edge of the sun visor and is slid towards the hinged end of the sun visor (as shown by 14122 in FIG. 14). The teeth in the interior of the horizontal clip (as shown in FIGS. 6B-6C) may help the horizontal clip to grip onto the sun visor. Next, with the sun visor still down, the vertical clip 7120 is slid from the bottom of the sun visor upwards along the hinged side until it reaches the top end of the sun visor (as shown by 14120 in FIG. 14). Again, similar to the horizontal clip, the teeth on the interior surface of the vertical clip (as shown by 17120T in FIG. 17C) may help the vertical clip to grip onto the sun visor. Next, the sun visor is flipped against the side window such that the user may access the vertical clip 7120, the bridge 7121, and the horizontal clip 7122 to make any necessary adjustments. The pivot hole 7121A is pushed onto and receives the right knob 7122R. The screw 7119 is used to secure the vertical clip 7120, the bridge 7121, and the horizontal clip 7122 all together by screwing it into screw hole 7122K through the kidney-shaped slot 7121B. The horizontal clip 7122 may also be provided with a screw hole 7122J and a left knob 7122L. Next, the holder (as shown by 14130 in FIG. 14) is mounted onto the sun visor while the apparatus faces the front windshield, by sliding the holder with the lock (as shown by 14131 in FIG. 14) onto the right side of the sun visor. The holder is positioned at the middle edge of the auxiliary visor panel (as shown by 6129 in FIG. 6A). The teeth in the interior of the holder (as shown by 29130B in FIG. 29A) may help the holder to grip onto the sun visor. The auxiliary visor panel (as shown by 6129 in FIG. 6A) is then pushed into the lock (as shown by 3131 in FIG. 3). The auxiliary visor panel (as shown by 6129 in FIG. 6A) may thus be held in this position by the lock 3131 such that the apparatus is in a closed state (as shown in FIG. 3). When the apparatus is needed in an open state, the auxiliary visor panel (as shown by 6129 in FIG. 6A) may be removed from the lock. When in an open state, the auxiliary visor panel (as shown by 6129 in FIG. 6A) may be held by a tube gripper ("tube gripper" or "gripper") mounted on the interior of the vehicle (as shown by 3132 in FIG. 3, and discussed further when referring to FIGS. 14-15).

As shown in FIG. 3, when the apparatus is mounted for use on a left-side driver's seat, both the sun visor 3100 and the auxiliary visor 3129 may be held together, and may also be folded up onto the ceiling of vehicle interior when not in use. To begin use of the apparatus, the sun visor may first be flipped down, and then the auxiliary visor may be taken out of the lock 3131 and flipped towards the side window of the vehicle (such as, for example, shown in FIG. 16). The tube within which the arm 3128 moves may then be inserted into the gripper 3132. The auxiliary panel 3129 may be able to be flipped to the side window without additional force. The upwards force of the bend-resistant spring 3128 may keep the arm 3128 in contact with the gripper 3132. At the same time, the open seam tube 3129A may maintain the angle of the auxiliary visor 3129 at a position parallel to the side window.

FIGS. 8A-8B illustrate the left side elevation view and another example of the left side elevation view, respectively, of the automatic adjustment unit of the adjustable sun visor device 8140, according to an aspect. The automatic adjustment unit may be used for maintaining stability and flexibility of the auxiliary visor unit, with relation to the existing sun visor of a vehicle and the side window of the vehicle. The automatic adjustment unit may be comprised of the ball seat 8123, the ball 8124, the plug 8126, the bend-resistant spring 8127, and the tension spring 8134.

The automatic adjustment unit may be assembled by carrying out the following exemplary process. First, the ball 8124 may be inserted into the ball compartment 8125, such that the leg 8124A of the ball extends downwards and out through the bottom end of the ball compartment 8125, such that the bottom end is sealed. Next, the plug 8126 may be inserted into the top end of the ball compartment, such that the leg 8126A extends upwards, thus securing the ball 8124 into the ball compartment 8125. Next, the ball compartment 8125 may be connected to the ball seat base 8123 by inserting the ball leg 8124A into the bowl 8123A, which may be provided with a hole for receiving the ball leg. The ball leg 8124A may be pushed inwards down into the bowl 8123A until the ball is securely held on the ball seat base 8123. Next, one end of the bend-resistant spring 8127 may be connected with the plug by inserting the plug leg 8126A into the spring 8127. The tension spring 8124 may force the ball compartment 8125 downwards around the center of the ball 8124. With no additional forces applied to the automatic adjustment unit, the bend-resistant spring 8127 may hold a first shape, as shown in FIG. 8A as an example. With an additional force applied to the automatic adjustment unit in the direction indicated by arrow 801AR, the bend-resistant spring 8127 may be pushed into a bent shape as shown in FIG. 8B as an example. With a force applied by the tension spring 8134 and an opposite force 801AR loaded onto the arm 8128, an automatic mechanical adjustment may be created.

Figure 10:
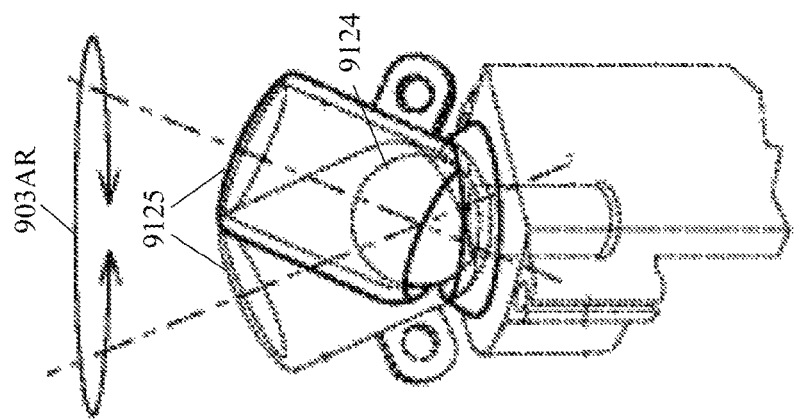
FIGS. 9-10 illustrate the sectional view and the perspective view, respectively, of the ball and ball compartment, according to an aspect.
Figure 9:
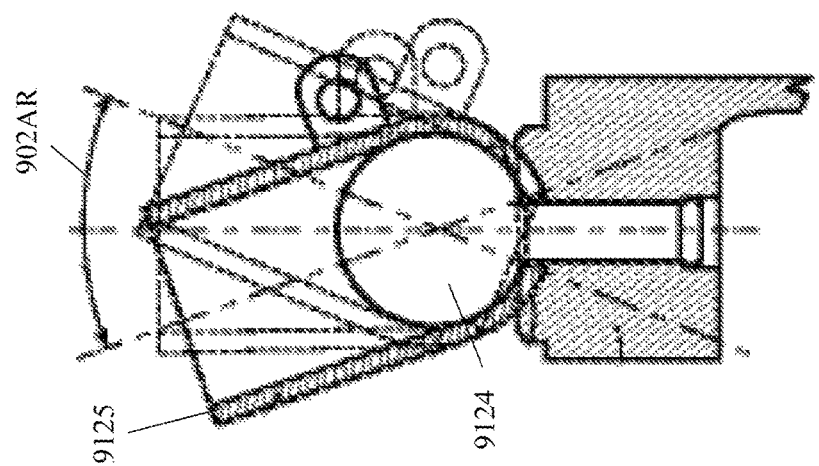

FIGS. 9-10 illustrate the sectional view and the perspective view, respectively, of the ball and ball compartment, according to an aspect. The ball compartment 9125 may pivot around the ball 9124. As an example, the ball compartment 9125 may pivot in the directions shown by arrows 902AR and 903AR.

Figure 11:
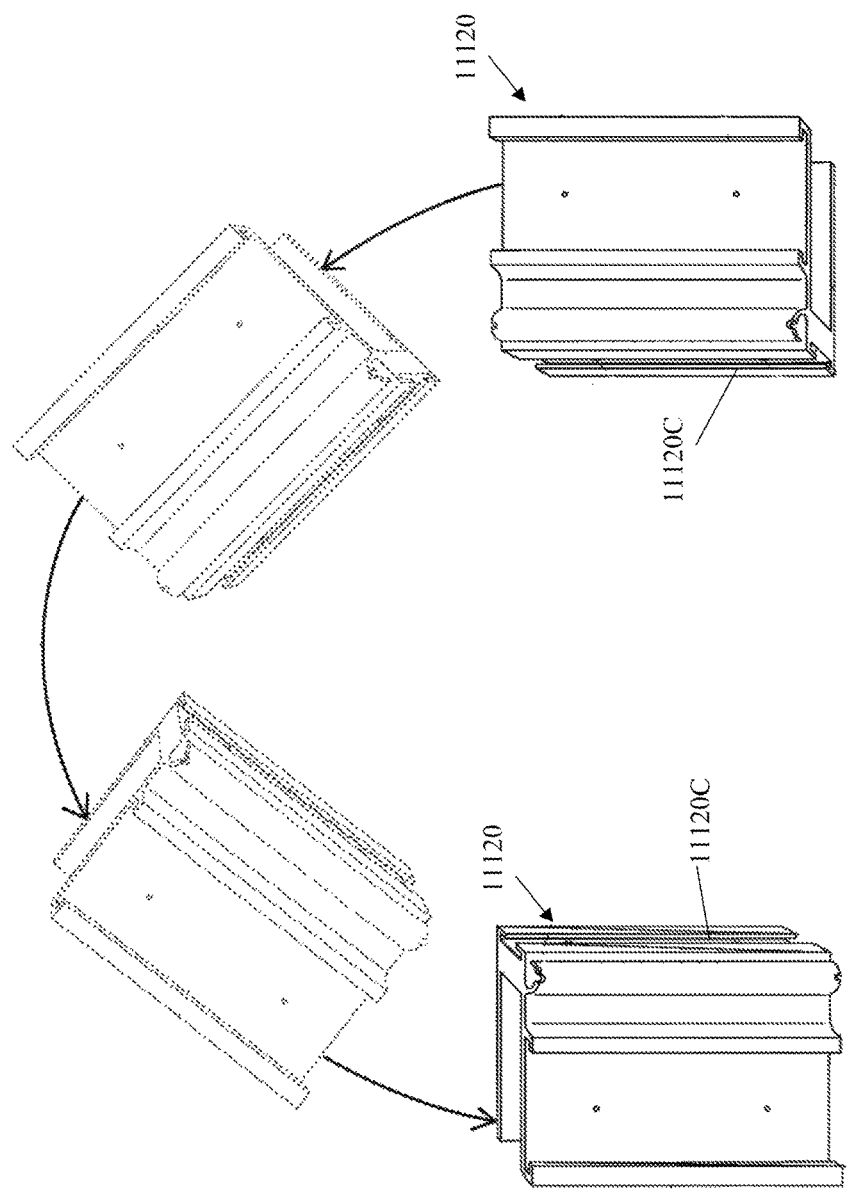
FIG. 11 illustrates an example of a process for adjusting the vertical clip in order to switch the automatic sun visor device from use on a right side of a vehicle to use on a left side of the vehicle, according to an aspect.

FIG. 11 illustrates an example of a process for adjusting the vertical clip 11120 in order to switch the automatic sun visor device from use on a right side of a vehicle to use on a left side of the vehicle, according to an aspect.

Figure 12:
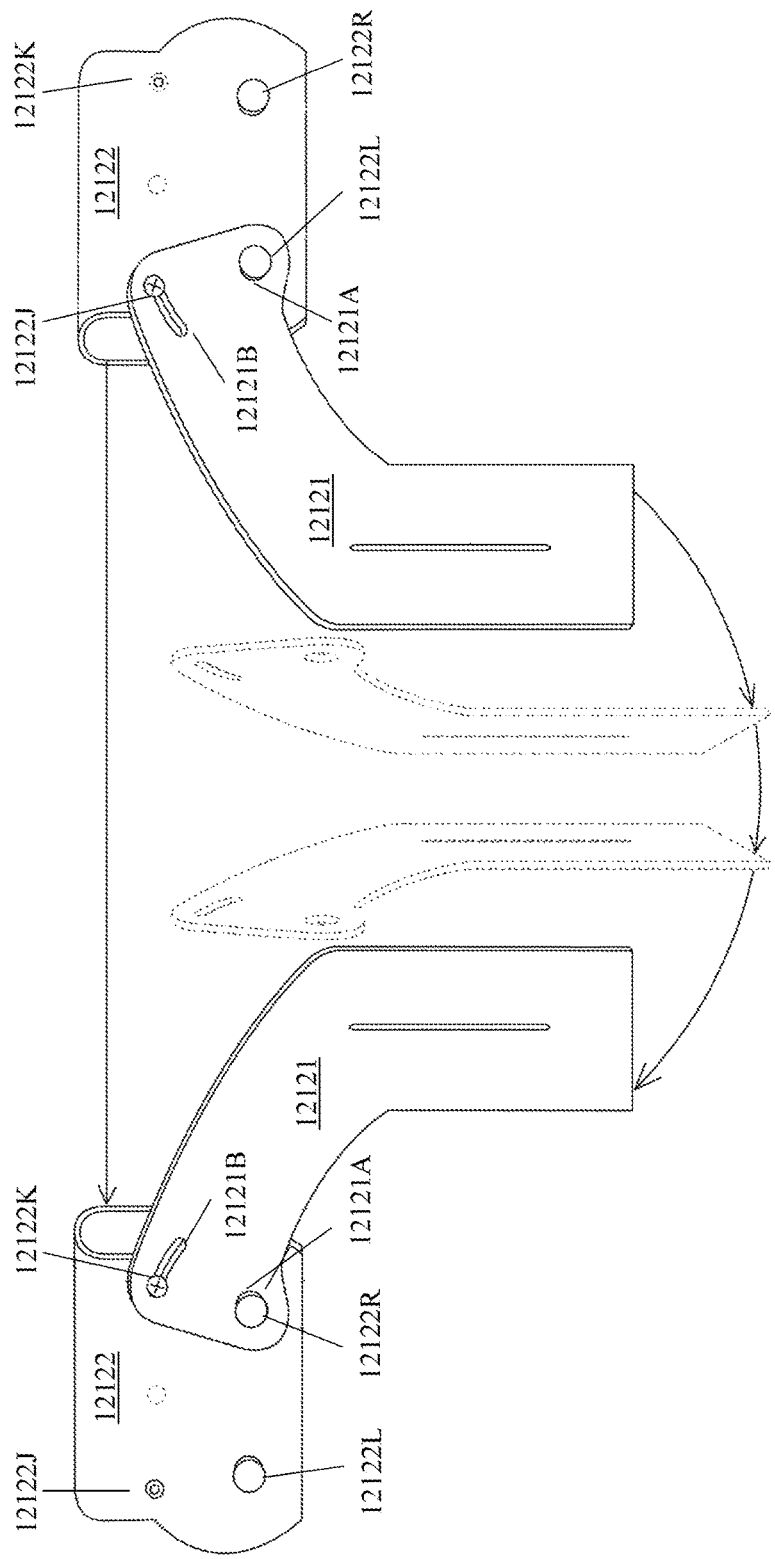
FIG. 12 illustrates an example of a process for adjusting the bridge and the horizontal clip in order to switch the automatic sun visor device from use on a right side of a vehicle to use on a left side of the vehicle, according to an aspect.

FIG. 12 illustrates an example of a process for adjusting the bridge and the horizontal clip in order to switch the automatic sun visor device from use on a right side of a vehicle to use on a left side of the vehicle, according to an aspect.

Figure 13:
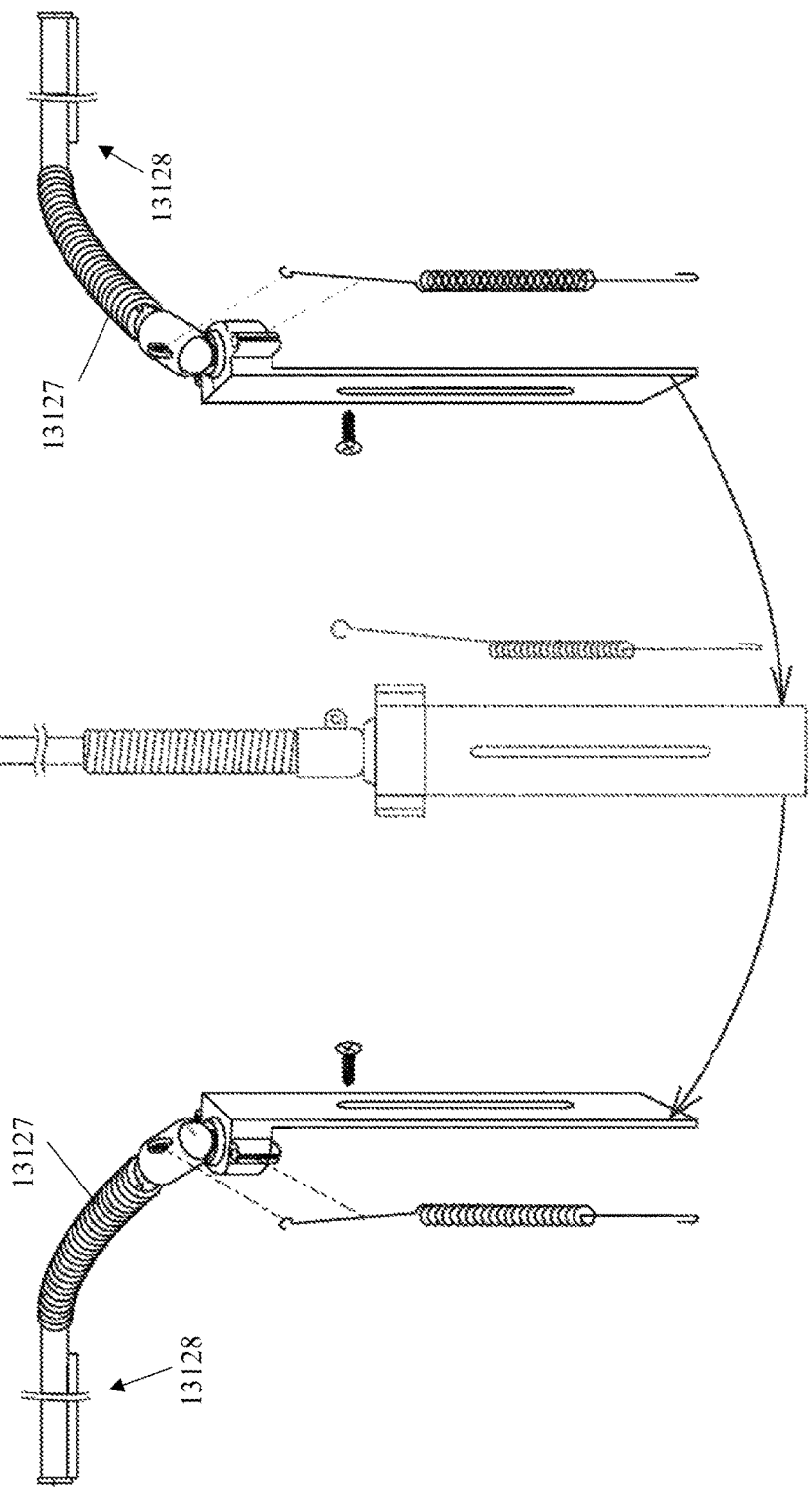
FIG. 13 illustrates an example of a process for adjusting the automatic adjustment unit in order to switch the automatic sun visor device from use on a right side of a vehicle to use on a left side of the vehicle, according to an aspect.

FIG. 13 illustrates an example of a process for adjusting the automatic adjustment unit in order to switch the automatic sun visor device from use on a right side of a vehicle to use on a left side of the vehicle, according to an aspect.

Referring to FIGS. 11-13, when the apparatus is assembled for use on a left side of a vehicle, it may also be converted for use on a right side of a vehicle by carrying out the following exemplary process. First, the base unit and the automatic adjustment units are disconnected from each other. Next, while the arm 13128 is connected to the bend-resistant spring 13127 within the automatic adjustment unit, the auxiliary visor (not shown in FIG. 13 for visual clarity) is disconnected from the arm 13128 by pushing the arm out through the open seam tube. Next, the vertical clip, bridge, and the horizontal clip of the base unit (as shown in FIGS. 6 and 7) are disconnected from each other. The vertical clip (as shown by 11120 in FIG. 11) is turned upside-down (180 degrees), with the track and guide rails 11120C facing in the opposite direction as they originally faced, as an example. Next, the bridge (as shown by 12121 in FIG. 12) is flipped 180degrees horizontally. Next, the bridge is reconnected with the horizontal clip 12122. When assembled for use on a left side of a vehicle, the pivot hole 12121A of the bridge may be connected with the right knob 12122R and the kidney-shaped slot 12121B may be connected with the right screw hole 12122K. When assembled for use on a right side of a vehicle, the pivot hole 12121A of the bridge may be connected with the left knob 12122L and the kidney-shaped slot 12121B may be connected with the left knob 12122L. Next, the base unit and the automatic adjustment unit may be connected back together, by following the assembly instructions of paragraph 0037. When assembling the apparatus for a right side of a vehicle, the tension spring (as shown by 7134 in FIG. 7) may have its U-hook 7134B hooked onto the second notch 7120N instead of the first notch 7120S which may be used for assembling the apparatus for a left side of a vehicle.

Figure 15:
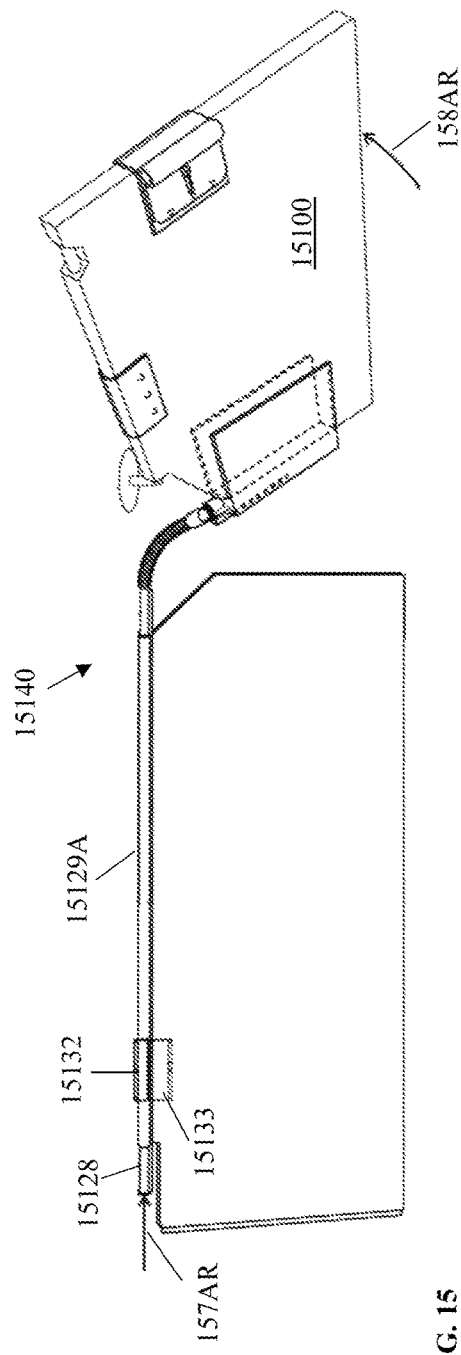

FIGS. 14-15 illustrate the perspective views of the adjustable sun visor device 14140 and 15140 clipped to a vehicle sun visor 14100 and 15100 at two different angles, according to an aspect. As an example, the adjustable sun visor device may maintain its position and angle even while the sun visor of a vehicle is flipped or adjusted to various positions. A tube gripper 14132 or 15132 (shown in detail in FIGS. 32A-32B) may be mounted in the interior of a vehicle, such as, for example, the frame of a left side window. The tube gripper may grip onto and hold the open seam tube 14129A and thus the arm 14128 or 15128 of the device. The tube gripper 14132 may be mounted onto the interior of the vehicle using, for example, double-sided adhesive 14133 or 14133. With the sun visor 14100 facing the front windshield of the vehicle as shown in FIG. 14, the sun visor may be flipped such as by a force in the directions indicated by arrows 146AR and 158AR. During these movements of the sun visor 14100 or 15100, the automatic adjustment unit (the ball, ball compartment, and bend-resistant spring) may make movements in order for the auxiliary visor 14129 or 15129 to remain in a stable position, and remain in the grip of the tube gripper 14132 or 15132. When a force is applied to the sun visor 14100 in the direction indicated by arrow 146AR, the force may be turned into a force as indicated by arrow 145AR. When a force is applied to the sun visor 15100 in the direction indicated by arrow 158AR, the force may be turned into a force as indicated by arrow 157AR. The forces 145AR or 157AR may push or pull the arm 14128 or 15128 in or out of through the open seam tube 14129A or 15129A as shown. A holder 14130 and an associated lock 14131 held together with a screw may also be provided as a locking unit, such that the locking unit may be mounted onto the sun visor 14100. The locking unit may be used to secure the adjustable sun visor device 14140 to the sun visor 14100.

Figure 16:
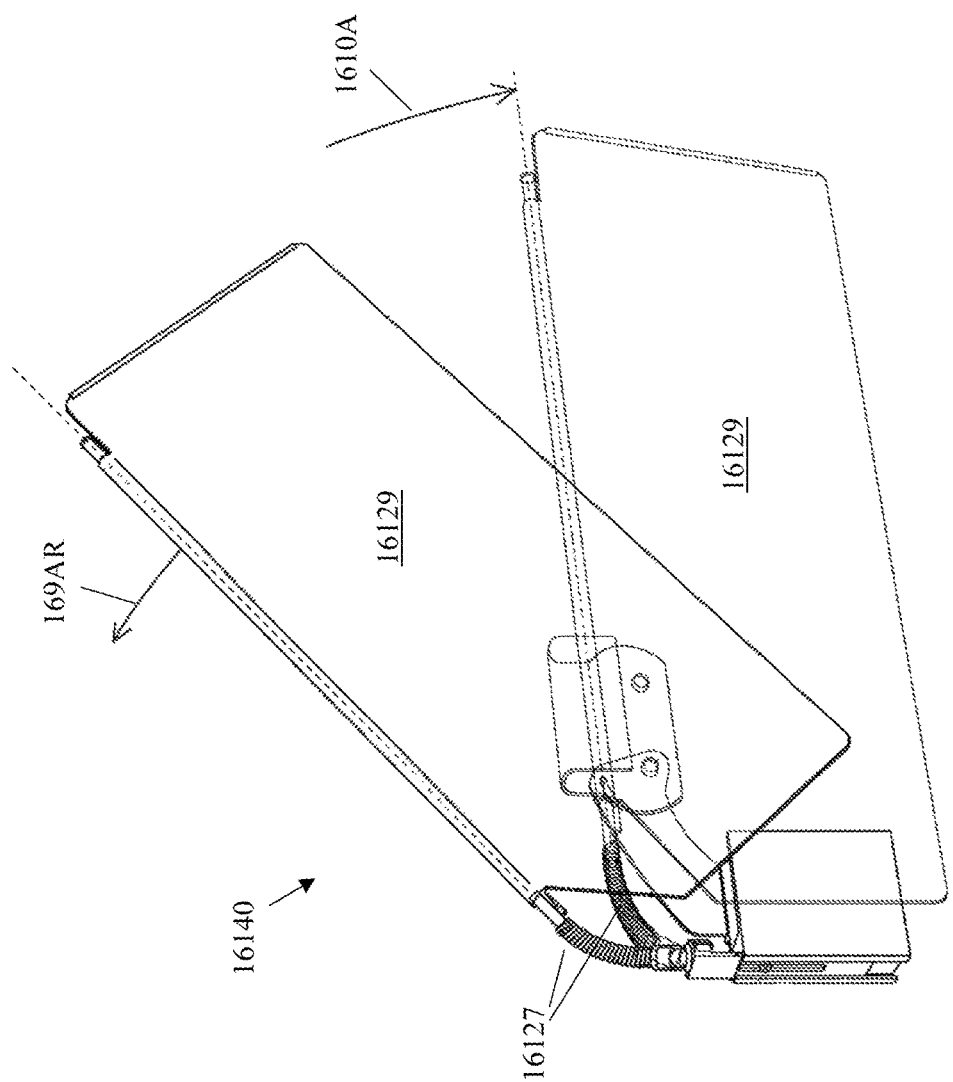
FIG. 16 illustrates the front perspective view of the range of motion the adjustable sun visor device 1640 may make, according to an aspect.

FIG. 16 illustrates the front perspective view of the range of motion the adjustable sun visor device 16140 may make, according to an aspect. The force indicated by arrow 169AR may indicate the direction that the auxiliary visor panel 16129 is biased towards due to the natural state of the bend-resistant spring 16127, when no additional forces are present. An additional force may be present when, for example, a ceiling in the interior of a vehicle pushes down in the direction of arrow 1610A onto the auxiliary visor panel 16129, which may cause the auxiliary visor panel 16129 to move into the direction indicated by arrow 1610AR. As another example, a user may press down on the auxiliary visor panel 16129. A force in the direction of 1610A may cause the bend-resistant spring 16127 to bend and may cause the adjustable sun visor device 16140 to be in a closed state.

FIGS. 17A-17D illustrate the front cutaway view, the side elevation view, the top plan view, and the rear elevation view, respectively, of the vertical clip 17120, according to an aspect.

Figures 18A, 18B:
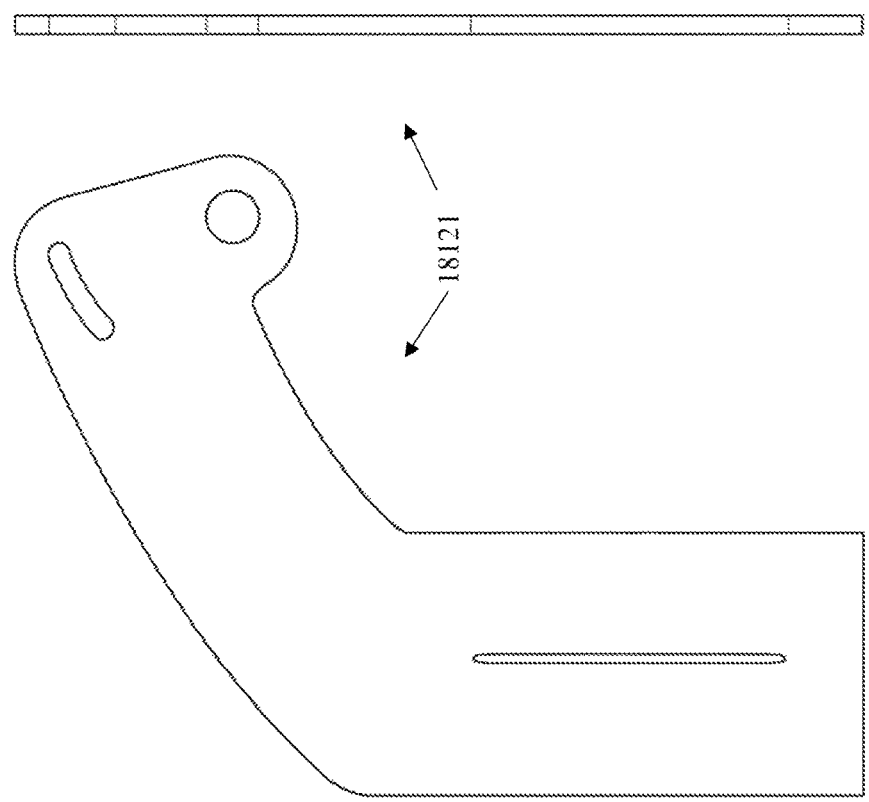
FIGS. 18A-18B illustrate the front view and the side elevation view, respectively, of the bridge, according to an aspect.

FIGS. 18A-18B illustrate the front view and the side elevation view, respectively, of the bridge 18121, according to an aspect.

FIGS. 19A-19C illustrate the front view, the side elevation view, and the bottom view, respectively, of the horizontal clip, according to an aspect.

FIGS. 20A-20D illustrate the rear view, the side view, the front view, and the top view, respectively, of the ball seat base 20123, according to an aspect.

FIGS. 21A-21B illustrate the bottom view and the side view, respectively, of the ball 21124, according to an aspect.

FIGS. 22A-22B illustrate the side view and the top view, respectively, of the ball compartment 22125, according to an aspect.

FIGS. 23A-23B illustrate the side view and the top view, respectively, of the plug 23126, according to an aspect.

FIGS. 24A-24B illustrate the side view and the top view, respectively, of the bend-resistant spring 24127, according to an aspect.

FIG. 25 illustrates the side view of the tension spring 25134, according to an aspect.

FIGS. 26A-26B illustrate the front view and the top view, respectively, of the holder 26130, according to an aspect.

FIGS. 27A-27B illustrate the front view and the top view, respectively, of the lock 27131, according to an aspect.

Figure 28B:
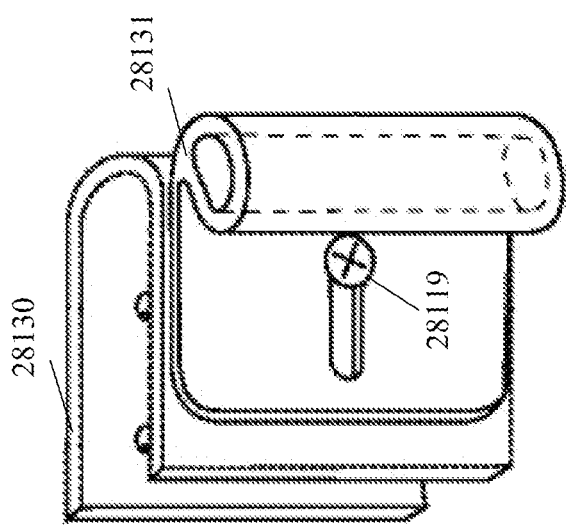
FIGS. 28A-28B illustrate the front perspective exploded view and the front perspective assembled view, respectively, of the holder and lock components of a first portion of a locking unit, according to an aspect.
Figure 28A:
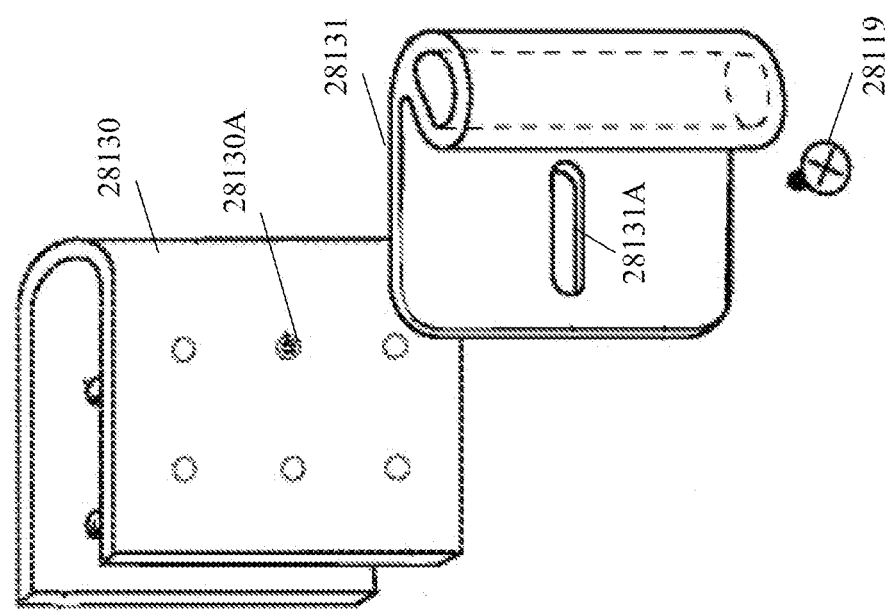

FIGS. 28A-28B illustrate the front perspective exploded view and the front perspective assembled view, respectively, of the holder 28130 and lock 28131 components of a first portion of a locking unit, according to an aspect. A screw 28119 may be used to assemble the holder 28130 and lock 28131 together, for example. A user may assemble the first portion of the locking unit by carrying out the following exemplary process. First, the lock 28131 may be positioned over the side of the holder 28130 having a screw hole 28130A. The lock guide hole 28131A is next positioned over the screw hole 28130A. Next, the screw 28119 is screwed into the screw hole to secure the holder 28130 and lock 28131 together.

FIGS. 29A-29B illustrate the front cutaway view and the rear cutaway view, respectively, of the holder 29130, according to an aspect. The holder may include teeth 29130B on the inner surface which may assist in gripping the sun visor, for example.

FIGS. 30A-30B illustrate the front view and the side elevation view, respectively, of the tube gripper 30132, according to an aspect.

FIGS. 31A-31B illustrate the front view and the top view, respectively, of the double-sided adhesive pad ("double-sided adhesive pad" or "double adhesive pad") 31133, according to an aspect.

Figure 32B:
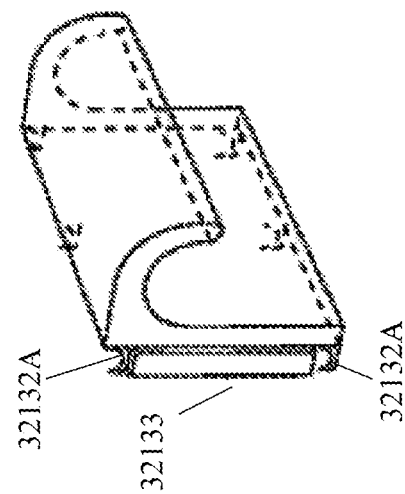
FIGS. 32A-32B illustrate the exploded front perspective view of the double adhesive pad and the stop, and the front perspective view of the double adhesive pad adhered to the stop, respectively, according to an aspect.
Figure 32A:
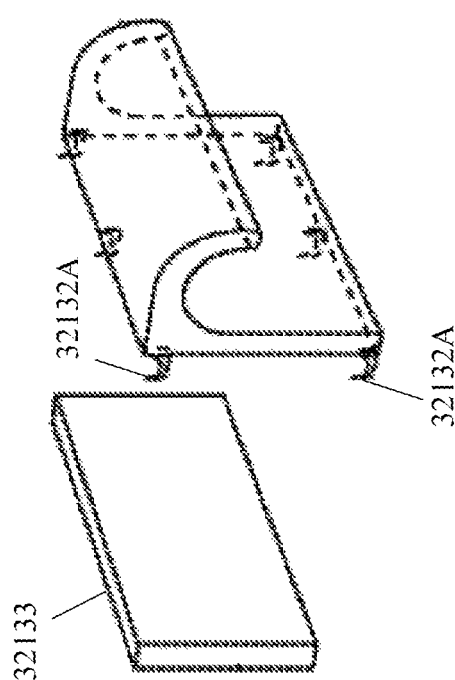

FIGS. 32A-32B illustrate the exploded front perspective view of the double adhesive pad and the stop, and the front perspective view of the double adhesive pad adhered to the stop, respectively, according to an aspect. The tube gripper 30132 of FIGS. 30A-30B together with the double adhesive pad 31133 of FIGS. 31A-32A may comprise a second portion of the locking unit. The second portion of the locking portion may be assembled by carrying out the following exemplary process. First, the double adhesive pad 32133, which may be provided with an adhesive on both sides, may be adhered to the tube gripper 32132 between the upward hooks 32132A. Next, the outward facing side of the double adhesive pad may be adhered to the interior of a vehicle such that the tube gripper may hold the arm of the adjustable sun visor device when the auxiliary panel is bent towards a side window of the car.

Figure 33A:
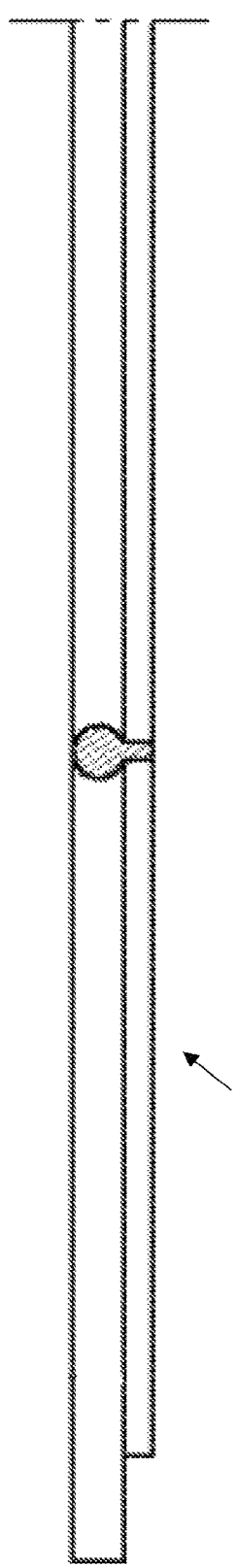
FIGS. 33A-33B illustrate the sectional side view and the side view, respectively, of the arm, according to an aspect.
Figure 33B:
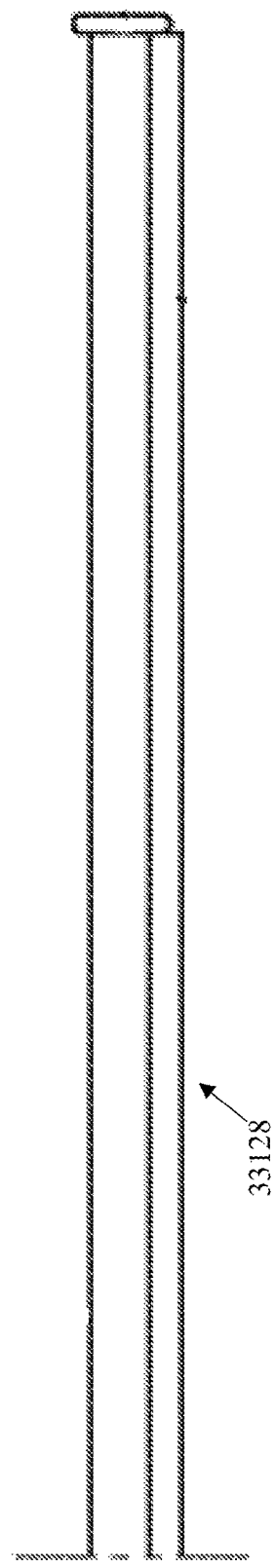

FIGS. 33A-33B illustrate the sectional side view and the side view, respectively, of the arm 33128, according to an aspect.

Figure 34A:
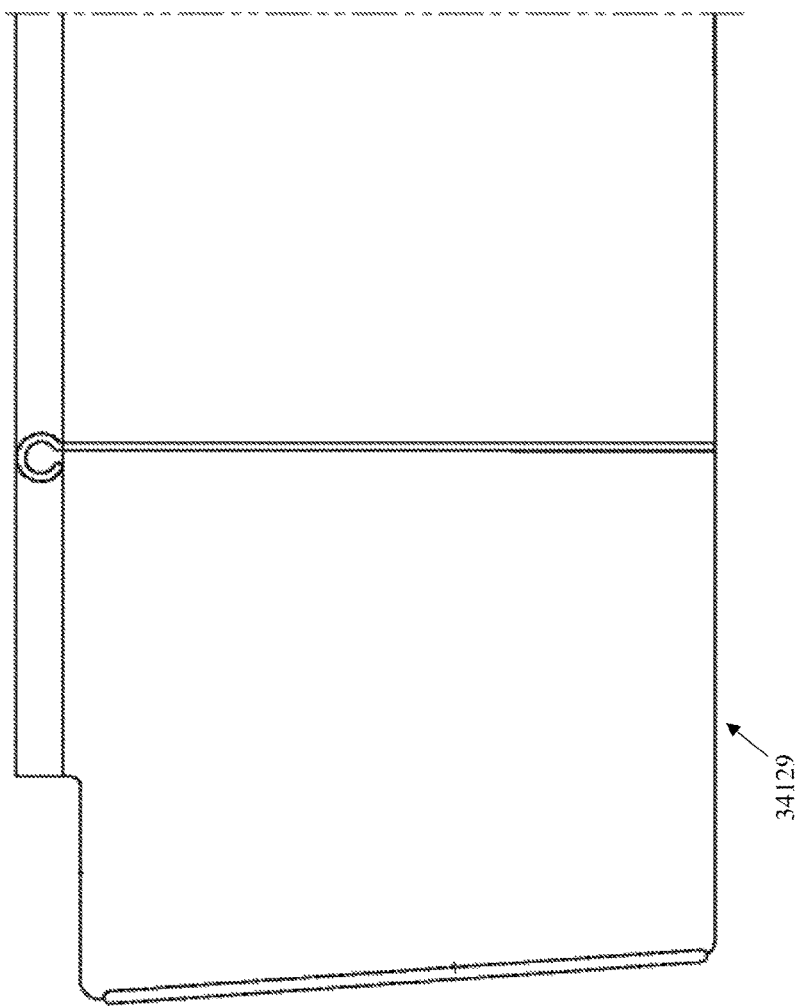
FIGS. 34A-34B illustrate the sectional side view and the side view, respectively, of the auxiliary visor, according to an aspect.
Figure 34B:
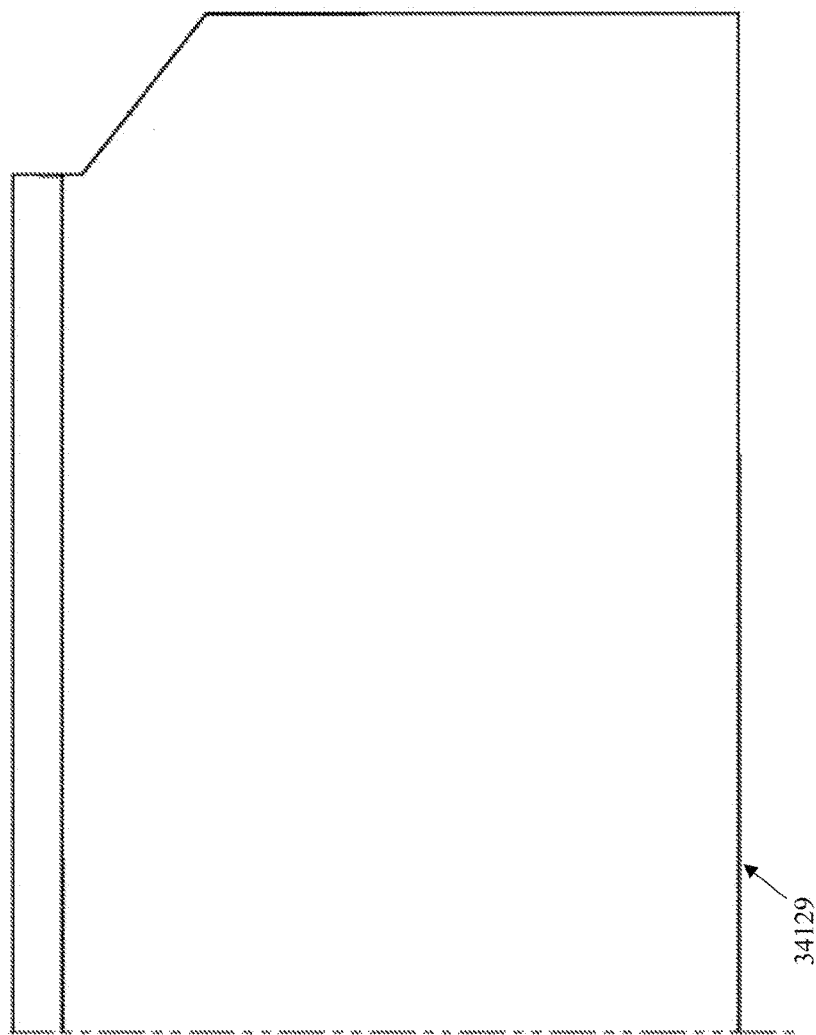

FIGS. 34A-34B illustrate the sectional side view and the side view, respectively, of the auxiliary visor 34129, according to an aspect. As an example, a top portion of the auxiliary visor panel may fit into the open seam tube (as shown by 4129A in FIG. 4) and the auxiliary visor panel 34129 may extend downwards from the tube and arm.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/ or examples. Hence, the scope of the invention is defined by the accompanying claims and their equivalents. Further, each and every claim is incorporated as further disclosure into the specification.

What is claimed is:

1. An adjustable sun visor apparatus for blocking light from a front and a side in a vehicle, together with a sun visor of the vehicle, the adjustable sun visor apparatus comprising:

an auxiliary visor unit having:

an arm having a first arm end having a stopper, and a second arm end;
an open seam tube having a first tube end and a second tube end, the open seam tube being configured to receive the arm, wherein the stopper is larger than the open seam tube; and
an auxiliary visor panel extending from the open seam tube between the first tube end and the second tube end, the auxiliary visor panel being configured to block light;
an automatic adjustment unit having:
a ball having a round ball portion and a ball leg portion;
a plug having a plug head portion and a plug leg portion;
a tension spring having a top hook and a bottom hook;
a ball compartment having a ring, the ball compartment being configured to house the round ball portion and the plug head portion;
a ball seat base having a hole configured to receive the ball leg portion into the ball seat base such that the ball is anchored into the ball seat base, the hole being in a center of a bowl configured to hold the round ball portion housed by the ball compartment, and a straight ball seat base portion extending downwards from the bowl;
a bend-resistant spring having a first spring end and a second spring end, the first spring end configured to receive the plug leg portion and the second spring end being configured to receive the second arm end;
wherein the ball compartment is configured to pivot around the ball such that the associated first spring end of the bend-resistant spring pivots around the ball;
a base unit having:
a bridge having a first straight bridge portion and a second curved bridge portion;
a vertical clip having a top vertical clip end and a bottom vertical clip end, a spring compartment configured to receive the tension spring, the spring compartment extending from the top vertical clip end and the bottom vertical clip end, the bottom vertical clip end having a first notch, jaws configured to grip the sun visor, a first set of guide rails configured to receive the straight ball seat base portion, and a second set of guide rails configured to receive the first straight bridge portion; and
a horizontal clip having a plurality of knobs, each knob of the plurality of knobs being configured to fit into a corresponding pivot hole of the bridge;
wherein the top hook is received into the ring, and the bottom hook is received into the first notch; and
wherein the tension spring is configured to bias the top hook and the bottom hook together and thus bias the ring, the bend-resistant spring, and the arm downwards;
such that a movement of the sun visor causes a movement of the vertical clip gripped to the sun visor, and also causes the arm to move within the open seam tube and thus prevents a movement of the auxiliary visor panel; and
a locking unit having a holder and a lock, the locking unit configured to be clipped to the sun visor and hold the auxiliary visor panel against the sun visor into a closed state or release the auxiliary visor panel from the sun visor into an open state;
such that in the open state the sun visor blocks light from the front and the auxiliary visor panel blocks light from the side in the vehicle.

2. The adjustable sun visor apparatus of claim 1, wherein an interior surface of the horizontal clip and an interior surface of the vertical clip further comprise teeth configured to grip the sun visor.

3. The adjustable sun visor apparatus of claim 1, wherein the bridge further comprises a straight slot on the first straight bridge portion and a kidney-shaped slot on the second curved bridge portion.

4. The adjustable sun visor apparatus of claim 1, wherein vertical clip further comprises a first plurality of screw holes, the horizontal clip further comprises a second plurality of screw holes, and the automatic adjustment unit and the base unit are connected together using a plurality of screws.

5. The adjustable sun visor apparatus of claim 1, further comprising a second notch on the top vertical clip end opposite of the first notch.

6. The adjustable sun visor apparatus of claim 1, further comprising a tube gripper and an associated double-sided adhesive, wherein a first side of the double-sided adhesive is adhered to an interior surface of the vehicle and a second side of the double-sided adhesive is adhered to the tube gripper, the tube gripper having a curved gripping portion configured to receive and hold the open seam tube.

7. The adjustable sun visor apparatus of claim 1, wherein the arm further comprises a strip extending from the first arm end to the second arm end, such that the strip prevents a circular movement of the arm.

8. The adjustable sun visor apparatus of claim 1, wherein the ball seat base further comprises a first spring guide and a second spring guide opposite of the first spring guide, the first spring guide and the second spring guide being configured to receive a neck portion of the tension spring.

9. An adjustable sun visor apparatus for blocking light from a front and a side in a vehicle, together with a sun visor of the vehicle, the adjustable sun visor apparatus comprising:
an auxiliary visor unit having:
an arm having a first arm end and a second arm end;
an open seam tube having a first tube end and a second tube end, the open seam tube being configured to receive the arm; and
an auxiliary visor panel extending from the open seam tube between the first tube end and the second tube end, the auxiliary visor panel being configured to block light;
an automatic adjustment unit having:
a ball having a round ball portion and a ball leg portion;
a plug having a plug head portion and a plug leg portion;
a tension spring having a top hook and a bottom hook;
a ball compartment having a ring, the ball compartment being configured to house the round ball portion and the plug head portion;
a ball seat base having a hole configured to receive the ball leg portion into the ball seat base such that the ball is anchored into the ball seat base;
a bend-resistant spring having a first spring end and a second spring end, the first spring end configured to receive the plug leg portion and the second spring end being configured to receive the second arm end;
wherein the ball compartment is configured to pivot around the ball such that the associated first spring end of the bend-resistant spring pivots around the ball;
a base unit having:
a bridge;
a first means for gripping onto a first edge of the sun visor; and a second means for gripping onto a second edge of the sun visor; wherein the bridge is configured to connect the first means for gripping onto the first edge of the sun visor to the second means for gripping onto the second edge of the sun visor; and wherein the automatic adjustment unit is configured to connect to the first means;

wherein the top hook is received into the ring, and the bottom hook is received into the first means for gripping onto the first edge of the sun visor; and wherein the tension spring is configured to bias the top hook and the bottom hook together and thus bias the ring, the bend-resistant spring, and the arm downwards;

such that a movement of the sun visor causes a movement of first means for gripping onto the first edge of the sun visor, and also causes the arm to move within the open seam tube and thus prevents a movement of the auxiliary visor panel;

such that in an open state the sun visor blocks light from the front and the auxiliary visor panel blocks light from the side in the vehicle.

10. The adjustable sun visor apparatus of claim 9, wherein the bridge further comprises a first straight bridge portion having a straight slot and a second curved bridge portion having a kidney-shaped slot.

11. The adjustable sun visor apparatus of claim 9, wherein the first means further comprises a first plurality of screw holes, the second means further comprises a second plurality of screw holes, and the automatic adjustment unit and the base unit are connected together using a plurality of screws.

12. The adjustable sun visor apparatus of claim 9, further comprising a tube gripper and an associated double-sided adhesive, wherein a first side of the double-sided adhesive is adhered to an interior surface of the vehicle and a second side of the double-sided adhesive is adhered to the tube gripper, the tube gripper having a curved gripping portion configured to receive and hold the open seam tube.

13. The adjustable sun visor apparatus of claim 9, wherein the arm further comprises a strip extending from the first arm end to the second arm end, such that the strip prevents a circular movement of the arm.

14. The adjustable sun visor apparatus of claim 9, wherein the ball seat base further comprises a first spring guide and a second spring guide opposite of the first spring guide, the first spring guide and the second spring guide being configured to receive a neck portion of the tension spring.

15. An adjustable sun visor apparatus for blocking light from a front and a side in a vehicle, together with a sun visor of the vehicle, the adjustable sun visor apparatus comprising:

an auxiliary visor unit configured to maintain a stable position of an auxiliary visor panel by having:
an arm having a first arm end and a second arm end;
a ball having a round ball portion and a ball leg portion;
a plug having a plug head portion and a plug leg portion;
a tension spring having a top hook and a bottom hook;
a ball compartment having a ring, the ball compartment being configured to house the round ball portion and the plug head portion;
a ball seat base having a top ball seat base end and a bottom ball seat base end, a hole at the top ball set base end, the hole being configured to receive the ball leg portion into the ball seat base such that the ball is anchored into the ball seat base, the hole being in a center of a bowl configured to hold the round ball portion housed by the ball compartment, and a straight ball seat base portion extending downwards from the bowl from the top ball seat base end to the bottom ball seat base end;
a bend-resistant spring having a first spring end and a second spring end, the first spring end configured to receive the plug leg portion and the second spring end being configured to receive the second arm end;
wherein the ball compartment is configured to pivot around the ball such that the associated first spring end of the bend-resistant spring pivots around the ball;
an open seam tube having a first tube end and a second tube end, the open seam tube being configured to receive the arm; and
wherein the auxiliary visor panel extends from the open seam tube between the first tube end and the second tube end, the auxiliary visor panel being configured to block light; and
wherein the tension spring is configured to bias the top hook received into the ring and the bottom hook received into the bottom ball seat base end together and thus bias the ring, the bend-resistant spring, and the arm downwards;
such that a movement of the sun visor causes a movement of the ball seat base and also causes the arm to move within the open seam tube and thus prevents a movement of the auxiliary visor panel.

16. The adjustable sun visor apparatus of claim 15, further comprising a tube gripper and an associated double-sided adhesive, wherein a first side of the double-sided adhesive is adhered to an interior surface of the vehicle and a second side of the double-sided adhesive is adhered to the tube gripper, the tube gripper having a curved gripping portion configured to receive and hold the open seam tube.

17. The adjustable sun visor apparatus of claim 16, further comprising a first means for gripping onto a first edge of the sun visor; and a second means for gripping onto a second edge of the sun visor.

18. The adjustable sun visor apparatus of claim 16, wherein the arm further comprises a strip extending from the first arm end to the second arm end, such that the strip prevents a circular movement of the arm.

19. The adjustable sun visor apparatus of claim 16, wherein the ball seat base further comprises a first spring guide and a second spring guide opposite of the first spring guide, the first spring guide and the second spring guide being configured to receive a neck portion of the tension spring.

20. The adjustable sun visor apparatus of claim 16, further comprising a locking unit having a holder and a lock, the locking unit configured to be clipped to the sun visor and hold the auxiliary visor panel against the sun visor into a closed state or release the auxiliary visor panel from the sun visor into an open state.

* * * * *